US012152899B2

(12) United States Patent
Miyake et al.

(10) Patent No.: US 12,152,899 B2
(45) Date of Patent: Nov. 26, 2024

(54) GUIDE TEXT GENERATION APPARATUS, GUIDE SYSTEM, GUIDE TEXT GENERATION METHOD AND PROGRAM

(71) Applicant: NIPPON TELEGRAPH AND TELEPHONE CORPORATION, Tokyo (JP)

(72) Inventors: Asuka Miyake, Tokyo (JP); Misa Hirao, Tokyo (JP); Hiroya Minami, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 207 days.

(21) Appl. No.: 17/423,166

(22) PCT Filed: Jan. 14, 2020

(86) PCT No.: PCT/JP2020/000869
§ 371 (c)(1),
(2) Date: Jul. 15, 2021

(87) PCT Pub. No.: WO2020/149257
PCT Pub. Date: Jul. 23, 2020

(65) Prior Publication Data
US 2022/0128375 A1  Apr. 28, 2022

(30) Foreign Application Priority Data
Jan. 16, 2019 (JP) .................... 2019-005169

(51) Int. Cl.
*G01C 21/00* (2006.01)
*G01C 21/36* (2006.01)

(52) U.S. Cl.
CPC ..... *G01C 21/3632* (2013.01); *G01C 21/3641* (2013.01); *G01C 21/3644* (2013.01)

(58) Field of Classification Search
CPC ............ G01C 21/3632; G01C 21/3641; G01C 21/3644; G08G 1/0968; G09B 29/10
See application file for complete search history.

(56) References Cited

U.S. PATENT DOCUMENTS 6,256,581 B1    7/2001  Fujii et al.
8,478,515 B1 *  7/2013  Foucher ................. G01C 21/20
                                                              701/1

(Continued)

FOREIGN PATENT DOCUMENTS

JP    200046567 A    2/2000
JP    2002039779 A   2/2002
JP    2016188779 A   11/2016

OTHER PUBLICATIONS

Anonymous. (Nov. 19, 2014). Method and System for Supplementing Driving Directions for People Navigating in Unfamiliar Areas. Prior art database—ip.com. https://ip.com/IPCOM/000239609 (Year: 2014).*

(Continued)

*Primary Examiner* — Anne Marie Antonucci
*Assistant Examiner* — Jordan T Smith

(57) ABSTRACT

A guidance text generation device that generates a guidance text for a user includes a route generation unit that generates a route including nodes from a point of departure to a destination, the nodes being represented by the point of departure, corners or/and ends at which a traveling direction changes and the destination and geographical information including types for classifying things located on a route connecting nodes, the types being classified into at least one of global brands, universal signs/facilities, objects peculiar to Japan, shops/facilities with alphanumeric notation, and shops, facilities and objects that do not fall under any of such categories and a guidance text generation unit that generates a guidance text for the generated route based on the gener- (Continued)

ated route, the geographical information on the generated route, presentation priority of the geographical information associated with the type of the geographical information.

13 Claims, 15 Drawing Sheets

(56) References Cited

U.S. PATENT DOCUMENTS

| | | | | |
|---|---|---|---|---|
| 2007/0299607 | A1* | 12/2007 | Cubillo | G01C 21/3644 701/431 |
| 2014/0372020 | A1* | 12/2014 | Stein | G01C 21/3644 701/410 |
| 2017/0177568 | A1* | 6/2017 | Nishikawa | G06F 40/263 |

OTHER PUBLICATIONS

Navitime Japan Co., Ltd. (2018) ""NAVITIME for Japan Travel" for foreigners visiting Japan, voice navigation of walking routes, and car navigation function added" literature, Jul. 31, 2018 [online] website: http://corporate.navitime.co.jp/topics/pr/201807/31_4519. html.

Iida et al. (2016) "Landmark Indication Method based on User Preference for Voice Navigation" Multimedia, Distributed, Collaborative and Mobile (DICOMO 2016) Symposium, Jul. 2016, pp. 782-788.

Nippon Telegraph and Telephone Corporation (2018) "Easy-to-imagine route guidance" NTT R&D Forum 2018 (Autumn), Nov. 26, 2018.

* cited by examiner

Fig. 3

| ROUTE NAME | POINT OF DEPARTURE | DESTINATION | NODE 1 LATITUDE/LONGITUDE | NODE 2 LATITUDE/LONGITUDE | NODE 3 LATITUDE/LONGITUDE | ... |
|---|---|---|---|---|---|---|
| ROUTE 1 | STATION A, EXIT NO.1 | ○○ TOWER | 35.6582,139.7456 | 35.6592,139.7466 | 35.6602,139.7476 | ... |
| ... | ... | ... | ... | ... | ... | ... |
| ... | ... | ... | ... | ... | ... | ... |

Fig. 4

| GEOGRAPHICAL INFORMATION NAME | EXPRESSED IN ROMAN ALPHABETS | TYPE | CATEGORY | COLOR | SIZE | LINE/POINT | LATITUDE/LONGITUDE | LEFT/RIGHT | ORIENTATION |
|---|---|---|---|---|---|---|---|---|---|
| ○○ BURGER | ENGLISH WORDS | GLOBAL BRAND | FAST FOOD | RED | LARGE | POINT | 35.6582,139.7457 | RIGHT | — |
| CAFE ○○ | ENGLISH WORDS | GLOBAL BRAND | CAFE | GREEN | SMALL | POINT | 35.6582,139.7458 | LEFT | — |
| TOILET | NONE | UNIVERSAL SIGN/FACILITY | — | — | — | POINT | 35.6582,139.7459 | RIGHT | — |
| PARKING LOT | NONE | UNIVERSAL SIGN/FACILITY | — | YELLOW | SMALL | POINT | 35.6582,139.7460 | RIGHT | — |
| ○○ TEMPLE | ROMAN ALPHABETS | OBJECTS PECULIAR TO JAPAN | RELIGIOUS FACILITIES | — | — | POINT | 35.6582,139.7461 | LEFT | — |
| ○○ SHOES | ENGLISH WORDS | SHOPS/FACILITIES EXPRESSED IN ROMAN ALPHABETS (ENGLISH WORDS) | SHOEMAKER | BLACK | LARGE | POINT | 35.6582,139.7462 | LEFT | — |
| POST OFFICE | ENGLISH WORDS | SHOPS/FACILITIES EXPRESSED IN ROMAN ALPHABETS (ENGLISH WORDS) | POST OFFICE | RED | LARGE | POINT | 35.6582,139.7463 | RIGHT | — |
| ○○ OF SUITS | ROMAN ALPHABETS | SHOPS/FACILITIES EXPRESSED IN ROMAN ALPHABETS (OTHER THAN ENGLISH WORDS) | SUIT SHOP | BLUE | LARGE | POINT | 35.6582,139.7463 | RIGHT | — |
| ○○ SUSHI | ROMAN ALPHABETS | SHOPS/FACILITIES EXPRESSED IN ROMAN ALPHABETS (OTHER THAN ENGLISH WORDS) | SUSHI SHOP | YELLOW | LARGE | POINT | 35.6582,139.7464 | CENTER | — |
| GATE | NONE | STRUCTURE | — | — | — | POINT | 35.6582,139.7465 | RIGHT | — |
| ○○ DRUG | NONE | SHOPS/FACILITIES OTHER THAN THOSE EXPRESSED IN ROMAN ALPHABETS | DRUGSTORE | ORANGE | LARGE | POINT | 35.6582,139.7465 | RIGHT | — |
| STAIRCASE | NONE | ROAD WITH CHARACTERISTIC SHAPE | — | — | — | LINE | 35.6582,139.7466 | CENTER | DOWN-HILL |
| GREEN BELT | NONE | ROAD WITH CHARACTERISTIC COLOR | — | GREEN | — | LINE | 35.6582,139.7467 | LEFT | — |
| ... | ... | ... | ... | ... | ... | ... | ... | ... | ... |

Fig. 5

| GEOGRAPHICAL INFORMATION NODE NAME | SHAPE OF NODE | EXPRESSED IN ROMAN ALPHABETS | DISTANCE TO NEXT NODE | DIRECTION OF NEXT TURN | NOTIFICATION POINT | TYPE | CATEGORY | COLOR | SIZE | LINE/POINT | LATITUDE/LONGITUDE | LEFT/RIGHT | ORIENTATION |
|---|---|---|---|---|---|---|---|---|---|---|---|---|---|
| NODE 1 (POINT OF DEPARTURE) | ALONG STREET | — | 100 | LEFT | ○ | — | — | — | — | — | — | — | — |
| ○○ CAMERA | — | NONE | 98 | — | — | SHOPS/FACILITIES NOT EXPRESSED IN ROMAN ALPHABETS | ELECTRIC SHOP | RED | LARGE | POINT | 35.6582,139.7458 | LEFT | — |
| PARKING LOT | — | — | 50 | — | — | UNIVERSAL SIGN/FACILITY | — | YELLOW | SMALL | POINT | 35.6582,139.7459 | RIGHT | — |
| CORNER | CORNER | — | 45 | — | — | — | — | — | — | — | 35.6582,139.7460 | LEFT | — |
| ○○ CAFE | — | ENGLISH WORDS | 40 | — | — | GLOBAL BRAND | CAFE | GREEN | SMALL | POINT | 35.6582,139.7461 | LEFT | — |
| POST OFFICE | — | ENGLISH WORDS | 8 | — | — | SHOPS/FACILITIES EXPRESSED IN ROMAN ALPHABETS (ENGLISH WORDS) | POST OFFICE | RED | LARGE | POINT | 35.6582,139.7462 | RIGHT | — |
| NODE 2 | CORNER | — | 170 | LEFT | ○ | — | — | — | — | — | 35.6582,139.7463 | — | — |
| ○○ SUSHI | — | ROMAN ALPHABETS | 168 | — | — | SHOPS/FACILITIES EXPRESSED IN ROMAN ALPHABETS (OTHER THAN ENGLISH WORDS) | SUSHI SHOP | YELLOW | LARGE | POINT | 35.6582,139.7464 | RIGHT | — |
| ○○ SHOES | — | ENGLISH WORDS | 70 | — | — | SHOPS/FACILITIES EXPRESSED IN ROMAN ALPHABETS (ENGLISH WORDS) | SHOE-MAKER | BLACK | LARGE | POINT | 35.6582,139.7465 | RIGHT | — |
| CORNER | CORNER | — | 50 | — | — | — | — | — | — | — | 35.6582,139.7466 | LEFT/RIGHT | — |
| ○○ RAMEN | — | NONE | 40 | — | — | SHOPS/FACILITIES NOT EXPRESSED IN ROMAN ALPHABETS | RAMEN SHOP | RED | SMALL | POINT | 35.6582,139.7467 | LEFT | — |
| NODE 3 | END | — | 90 | RIGHT | ○ | — | — | — | — | — | 35.6582,139.7468 | — | — |
| ○○ DRUG | — | NONE | 88 | — | — | SHOPS/FACILITIES NOT EXPRESSED IN ROMAN ALPHABETS | DRUGSTORE | ORANGE | LARGE | POINT | 35.6582,139.7469 | RIGHT | — |
| ×× SUSHI | — | NONE | 85 | — | — | SHOPS/FACILITIES NOT EXPRESSED IN ROMAN ALPHABETS | SUSHI SHOP | BLACK | SMALL | POINT | 35.6582,139.7470 | LEFT | — |
| NODE 4 (DESTINATION) | ALONG STREET | — | 0 | — | ○ | — | — | — | — | — | 35.6582,139.7471 | — | — |

Fig. 8

| GEOGRAPHICAL INFORMATION NODE NAME | SHAPE OF NODE | EXPRESSED IN ROMAN ALPHABETS | DISTANCE TO NEXT NODE | DIRECTION OF NEXT TURN | NOTIFICATION POINT | TYPE | CATEGORY | COLOR | SIZE | LINE/POINT | LATITUDE/LONGITUDE | LEFT/RIGHT | ORIENTATION |
|---|---|---|---|---|---|---|---|---|---|---|---|---|---|
| NODE 1 (POINT OF DEPARTURE) | ALONG STREET | — | — | — | ○ | — | — | — | — | — | 35.6582, 139.7457 | — | — |
| ○○ CAMERA | — | NONE | 100 | LEFT | — | SHOPS/FACILITIES NOT EXPRESSED IN ROMAN ALPHABETS | ELECTRIC SHOP | RED | LARGE | POINT | 35.6582, 139.7458 | LEFT | — |
| PARKING LOT | — | — | 98 | — | — | UNIVERSAL SIGN/FACILITY | — | YELLOW | SMALL | POINT | 35.6582, 139.7459 | RIGHT | — |
| CORNER | CORNER | — | 50 | — | — | — | — | — | — | — | 35.6582, 139.7460 | LEFT | — |
| ○○ CAFE | — | ENGLISH WORDS | 45 | — | — | GLOBAL BRAND | CAFE | GREEN | SMALL | POINT | 35.6582, 139.7461 | LEFT | — |
| POST OFFICE | — | ENGLISH WORDS | 40 | — | — | SHOPS/FACILITIES EXPRESSED IN ROMAN ALPHABETS (ENGLISH WORDS) | POST OFFICE | RED | LARGE | POINT | 35.6582, 139.7462 | RIGHT | — |
| NODE 2 | CORNER | — | 8 | LEFT | ○ | — | — | — | — | — | 35.6582, 139.7463 | — | — |
| ○○ SUSHI | — | ROMAN ALPHABETS | 170 | — | — | SHOPS/FACILITIES EXPRESSED IN ROMAN ALPHABETS (OTHER THAN ENGLISH WORDS) | SUSHI SHOP | YELLOW | LARGE | POINT | 35.6582, 139.7464 | RIGHT | — |
| ○○ SHOES | — | ENGLISH WORDS | 168 | — | — | SHOPS/FACILITIES EXPRESSED IN ROMAN ALPHABETS (ENGLISH WORDS) | SHOE-MAKER | BLACK | LARGE | POINT | 35.6582, 139.7465 | RIGHT | — |
| CORNER | CORNER | — | 70 | — | — | — | — | — | — | — | 35.6582, 139.7466 | LEFT/RIGHT | — |
| ○○ RAMEN | — | NONE | 50 | — | — | SHOPS/FACILITIES NOT EXPRESSED IN ROMAN ALPHABETS | RAMEN SHOP | RED | SMALL | POINT | 35.6582, 139.7467 | LEFT | — |
| NODE 3 | END | — | 40 | — | ○ | — | — | — | — | — | 35.6582, 139.7468 | — | — |
|  |  |  | 90 | RIGHT |  |  |  |  |  |  |  |  |  |

OUTPUT EXAMPLE (TEXT OF POINT OF DEPARTURE)
YOUR WILL ARRIVE AT DESTINATION IN 5 MINUTES. PLEASE STAND WITH ELECTRIC SHOP WITH LARGE RED SIGNBOARD ON YOUR LEFT. GO STRAIGHT TO SECOND CORNER ON YOUR LEFT AND TURN LEFT IN CORNER WHERE POST OFFICE IS ON YOUR RIGHT.

(TEXT ON WAY)
○○ CAFE IS ON YOUR LEFT.

(TEXT BEFORE NODE)
SOON, YOU WILL TURN LEFT IN CORNER WHERE POST OFFICE IS ON YOUR RIGHT.

Fig. 9

| GEOGRAPHICAL INFORMATION/NODE NAME | SHAPE OF NODE | EXPRESSED IN ROMAN ALPHABETS | DISTANCE TO NEXT NODE | DIRECTION OF NEXT TURN | NOTIFICATION POINT | TYPE | CATEGORY | COLOR | SIZE | LINE/POINT | LATITUDE/LONGITUDE | LEFT/RIGHT | ORIENTATION |
|---|---|---|---|---|---|---|---|---|---|---|---|---|---|
| NODE 2 | CORNER | — | 170 | LEFT | ○ | — | — | — | — | — | 35.6582,139.7463 | — | — |
| ○○ SUSHI | — | ROMAN ALPHA-BETS | 168 | — | — | SHOPS/FACILITIES EXPRESSED IN ROMAN ALPHABETS (OTHER THAN ENGLISH WORDS) | SUSHI SHOP | YELLOW | LARGE | POINT | 35.6582,139.7464 | RIGHT | — |
| ○○ SHOES | — | ENGLISH WORDS | 70 | — | — | SHOPS/FACILITIES EXPRESSED IN ROMAN ALPHABETS (ENGLISH WORDS) | SHOE-MAKER | BLACK | LARGE | POINT | 35.6582,139.7465 | RIGHT | — |
| CORNER | CORNER | — | 50 | — | — | — | — | — | — | — | 35.6582,139.7466 | LEFT/RIGHT | — |
| ○○ RAMEN | — | NONE | 40 | — | — | SHOPS/FACILITIES NOT EXPRESSED IN ROMAN ALPHABETS | RAMEN SHOP | RED | SMALL | POINT | 35.6582,139.7467 | LEFT | — |
| NODE 3 | END | — | 90 | RIGHT | ○ | — | — | — | — | — | 35.6582,139.7468 | — | — |
| ○○ DRUG | — | NONE | 88 | — | — | SHOPS/FACILITIES NOT EXPRESSED IN ROMAN ALPHABETS | DRUG-STORE | ORANGE | LARGE | POINT | 35.6582,139.7469 | RIGHT | — |
| ×× SUSHI | — | NONE | 85 | — | — | SHOPS/FACILITIES NOT EXPRESSED IN ROMAN ALPHABETS | SUSHI SHOP | BLACK | SMALL | POINT | 35.6582,139.7470 | LEFT | — |
| NODE 4 (DESTINATION) | ALONG STREET | — | 0 | — | ○ | — | — | — | — | — | 35.6582,139.7471 | — | — |

OUTPUT EXAMPLE (TEXT OF NODE)
AFTER TURNING LEFT, YOU WILL SEE ○○ SUSHI ON YOUR RIGHT. NEXT, GO STRAIGHT TO END AND TURN RIGHT.

(TEXT ON WAY)
○○ SHOES IS ON YOUR RIGHT.

(TEXT BEFORE NODE)
SOON, YOU WILL TURN RIGHT AT END.

Fig. 10

| GEOGRAPHICAL INFORMATION NODE NAME | SHAPE OF NODE | EXPRESSED IN ROMAN ALPHABETS | DISTANCE TO NEXT NODE | DIRECTION OF NEXT TURN | NOTIFICATION POINT | TYPE | CATEGORY | COLOR | SIZE | LINE/ POINT | LATITUDE/ LONGITUDE | LEFT/ RIGHT | ORIENTATION |
|---|---|---|---|---|---|---|---|---|---|---|---|---|---|
| NODE 3 | END | — | 90 | RIGHT | ○ | — | — | — | — | — | 35.6582, 139.7468 | — | — |
| ○○ DRUG | — | NONE | 88 | — | — | SHOPS/FACILITIES NOT EXPRESSED IN ROMAN ALPHABETS | DRUG-STORE | ORANGE | LARGE | POINT | 35.6582, 139.7469 | RIGHT | — |
| ×× SUSHI | — | NONE | 85 | — | — | SHOPS/FACILITIES NOT EXPRESSED IN ROMAN ALPHABETS | SUSHI SHOP | BLACK | SMALL | POINT | 35.6582, 139.7470 | LEFT | — |
| NODE 4 (DESTINATION) | ALONG STREET | — | 0 | — | ○ | — | — | — | — | — | 35.6582, 139.7471 | — | — |

OUTPUT EXAMPLE (TEXT OF NODE)
AFTER TURNING RIGHT HERE, YOU WILL SEE DRUGSTORE WITH LARGE ORANGE SIGNBOARD ON YOUR RIGHT AND SUSHI SHOP WITH SMALL BLACK SIGNBOARD ON YOUR LEFT. NEXT, GO STRAIGHT 90 m AND YOU WILL SEE DESTINATION ON YOUR RIGHT.

(TEXT BEFORE NODE)
SOON, YOU WILL SEE DESTINATION ON YOUR RIGHT.

(TEXT OF NODE)
YOU HAVE ARRIVED AT DESTINATION.

Fig. 11

| CLASSIFICATION | TYPE | EXAMPLE | PRIORITY |
|---|---|---|---|
| GUIDANCE AT ANY PLACE | GLOBAL BRAND | WORLDWIDE FAST FOOD SHOPS, CAFES, GAME CENTERS OR THE LIKE | 1 |
| | UNIVERSAL SIGN/FACILITY | TOILETS, PARKING LOTS, PARKS, POLICE BOXES, INFORMATION, STATIONS, CROSSINGS OR THE LIKE | 2 |
| | OBJECTS PECULIAR TO JAPAN | TEMPLES/SHRINES OR THE LIKE | 3 |
| GUIDANCE AT NODE (EXPRESSED IN ROMAN ALPHABETS) | SHOPS/FACILITIES EXPRESSED IN ROMAN ALPHABETS (ENGLISH WORDS) | SHOPS/FACILITIES, NAMES OF WHICH INCLUDE ENGLISH WORDS, NUMBERS OR ACRONYMS (HELLO, APPLE, RED, 123, NNN OR THE LIKE) | 4 |
| | SHOPS/FACILITIES EXPRESSED IN ROMAN ALPHABETS (OTHER THAN ENGLISH WORDS) | SHOPS/FACILITIES, NAMES OF WHICH INCLUDE CHARACTERS EXPRESSED IN ROMAN ALPHABETS BUT NOT ENGLISH WORDS (OHAYO, RINGO, SHIBUYA OR THE LIKE) | 5 |
| | STRUCTURE | GATE, TOWER, OBJECT OR THE LIKE | 6 |
| GUIDANCE AT NODE (NOT EXPRESSED IN ROMAN ALPHABETS) | SHOPS/FACILITIES NOT EXPRESSED IN ROMAN ALPHABETS | SHOPS/FACILITIES, NAMES OF WHICH INCLUDE CHARACTERS NOT EXPRESSED IN ROMAN ALPHABETS SUCH AS JAPANESE OR CHINESE (OHAYO, SUSHI, RAMEN OR THE LIKE) | 7 |
| | ROAD WITH CHARACTERISTIC SHAPE | STAIRCASE, SLOPE OR THE LIKE | 8 |
| | ROAD WITH CHARACTERISTIC COLOR | GREEN BELT, SCHOOL ZONE, COLOR PAVEMENT OR THE LIKE | 9 |

Fig. 13

| GEOGRAPHICAL INFORMATION/ NODE NAME | SHAPE OF NODE | EXPRESSED IN ROMAN ALPHABETS | DISTANCE TO NEXT NODE | DIRECTION OF NEXT TURN | NOTIFI- CATION POINT | TYPE | CATEGORY | COLOR | SIZE | LINE/ POINT | LATITUDE/ LONGITUDE | LEFT/ RIGHT | ORI- ENTA- TION |
|---|---|---|---|---|---|---|---|---|---|---|---|---|---|
| NODE 1 (POINT OF DEPARTURE) | ALONG STREET | — | 100 | LEFT | O | — | — | — | — | — | 35.6582,139.7457 | — | — |
| ○○ CAMERA | — | NONE | 98 | — | — | SHOPS/FACILITIES NOT EXPRESSED IN ROMAN ALPHABETS | ELECTRIC SHOP | RED | LARGE | POINT | 35.6582,139.7458 | LEFT | — |
| PARKING LOT | — | — | 50 | — | — | UNIVERSAL SIGN/FACILITY | — | YELLOW | SMALL | POINT | 35.6582,139.7459 | RIGHT | — |
| CORNER | CORNER | — | 45 | — | — | — | — | — | — | — | 35.6582,139.7460 | LEFT | — |
| ○○ CAFE | — | ENGLISH WORDS | 40 | — | — | GLOBAL BRAND | CAFE | GREEN | SMALL | POINT | 35.6582,139.7461 | LEFT | — |
| POST OFFICE | — | ENGLISH WORDS | 8 | — | — | SHOPS/FACILITIES EXPRESSED IN ROMAN ALPHABETS (ENGLISH WORDS) | POST OFFICE | RED | LARGE | POINT | 35.6582,139.7462 | RIGHT | — |
| NODE 2 | CORNER | — | 170 | LEFT | O | — | — | — | — | — | 35.6582,139.7463 | — | — |
| ○○ SUSHI | — | ROMAN ALPHA- BETS | 168 | — | — | SHOPS/FACILITIES EXPRESSED IN ROMAN ALPHABETS (OTHER THAN ENGLISH WORDS) | SUSHI SHOP | YELLOW | LARGE | POINT | 35.6582,139.7464 | RIGHT | — |
| ○○ SHOES | — | ENGLISH WORDS | 70 | — | — | SHOPS/FACILITIES EXPRESSED IN ROMAN ALPHABETS (ENGLISH WORDS) | SHOE- MAKER | BLACK | LARGE | POINT | 35.6582,139.7465 | RIGHT | — |
| CORNER | CORNER | — | 50 | — | — | — | — | — | — | — | 35.6582,139.7466 | LEFT/RIGHT | — |
| ○○ RAMEN | — | NONE | 40 | — | — | SHOPS/FACILITIES NOT EXPRESSED IN ROMAN ALPHABETS | RAMEN SHOP | RED | SMALL | POINT | 35.6582,139.7467 | LEFT | — |
| NODE 3 | END | — | 90 | RIGHT | O | — | — | — | — | — | 35.6582,139.7468 | — | — |

OUTPUT EXAMPLE (TEXT OF ROUTE)
GO STRAIGHT TO FIRST CORNER ON YOUR LEFT AND TURN LEFT IN CORNER WHERE POST OFFICE IS ON YOUR RIGHT.

GUIDE TEXT GENERATION APPARATUS, GUIDE SYSTEM, GUIDE TEXT GENERATION METHOD AND PROGRAM

CROSS-REFERENCE TO RELATED APPLICATIONS

This application is a U.S. 371 Application of International Patent Application No. PCT/JP2020/000869, filed on 14 Jan. 2020, which application claims priority to and the benefit of JP Application No. 2019-005169, filed on 16 Jan. 2019, the disclosures of which are hereby incorporated herein by reference in their entireties.

TECHNICAL FIELD

The present invention relates to a guidance text generation device, a guidance system, a guidance text generation method and program.

BACKGROUND ART

Conventionally, walker navigation systems using portable terminals or the like have been proposed. From the viewport of the danger of operating the terminals while walking, there is a demand for techniques for navigation by voice instead of using screens of the terminals. For example, Patent Literature 1 describes a system that automatically creates guidance language information including landmarks that serve as symbols to go from a present location to a destination and outputs the guidance language information by voice.

Such navigation systems are not only used within users' ordinary living areas but also are required at travel destinations including domestic and overseas. For example, Non-Patent Literature 1 describes a navigation system for foreigners and Non-Patent Literature 2 describes a navigation system in accordance with user attributes such as country, region, gender, age or the like.

CITATION LIST

Patent Literature

Patent Literature 1: Japanese Patent Application Laid-Open No. 2000-46567

Non-Patent Literature

Non-Patent Literature 1: "For foreign visitors to Japan "NAVITIME for Japan Travel", "voice navigation for walking routes and car navigation and car navigation functions added" Internet <URL: http://corporate.navitime.co.jp/topics/pr/201807/31_4519. html>, searched on Oct. 9, 2018

Non-Patent Literature 2: Kazuhiro Iida, Ken Sakurada, Satoshi Hiroi, Nobuo Kawaguchi. Proposing Landmark Presentation Technique in Consideration of User Attributes in Voice Navigation. Multimedia, Distribution, Coordination and Mobile (DICOMO2016) Symposium, pp 782-788, 2016.

SUMMARY OF THE INVENTION

Technical Problem

The technique described in Non-Patent Literature 1 provides voice navigation for walking routes and car navigation functions for foreign visitors to Japan. However, support for foreign visitors to Japan is limited to translated characters and voices and has semantically the same contents as navigation for Japanese people who can read Japanese and who are familiar with the land. Therefore, when those foreign visitors are given guidance using shops presenting signboards only written in Japanese or personal shops with signboards written in English but unfamiliar as landmarks, they may not be able to find the landmarks or even when they find the landmarks, they cannot be confident and may get lost.

On the other hand, the technique described in Non-Patent Literature 2 describes a method that picks up interests and tastes as user attributes and estimates landmarks easy to recognize according to the interests and tastes using Collaborative Filtering. It is possible to estimate landmarks easy to recognize for foreign visitors to Japan using this method. However, when using mechanical learning such as Collaborative Filtering, a large amount of data is required for learning to be specialized for users using the navigation system in advance. In Collaborative Filtering, estimation is basically made based on the user's action. Accordingly, when landmarks that have not been used for leaning such as new shops appear, the landmarks need to be relearned.

An object of the present invention is to provide guidance using things on a route, which are easier to find and in which the user can be more confident during navigation in a situation in which the user is not familiar with the land.

Means for Solving the Problem

A guidance text generation device according to one aspect of the present invention is a guidance text generation device that generates a guidance text for a user, including:
  a route generation unit that generates a route including nodes from a point of departure to a destination, the nodes being represented by the point of departure, corners or/and ends at which a traveling direction changes and the destination and
  geographical information including types for classifying things located on a route connecting nodes, the types being classified into at least one of global brands, universal signs/facilities, objects peculiar to Japan, shops/facilities with alphanumeric notation, and shops, facilities, objects that do not fall under any of such categories; and
  a guidance text generation unit that generates a guidance text for the generated route based on the generated route, the geographical information on the generated route, presentation priority of the geographical information associated with the type of the geographical information.

A guidance system according to one aspect of the present invention is a guidance system including a guidance text generation device that generates a guidance text for a user and a guidance text output device that outputs the guidance text to the user, in which
  the guidance text generation device includes:
  a route generation unit that generates a route including nodes from a point of departure to a destination, the nodes being represented by the point of departure, corners or/and ends at which a traveling direction changes and the destination and
  geographical information including types for classifying things located on a route connecting nodes, the types being classified into at least one of global brands, universal signs/facilities, objects peculiar to Japan, shops/facilities with alphanumeric notation, and shops, facilities, objects that do not fall under any of such categories; and a guidance text generation unit that generates a guidance text for the generated route based on the generated route, the geographical information on the generated route, presentation priority of the geographical information associated with the type of the geographical information, and the guidance text output device includes:

a present location acquisition unit that acquires the user's present location;

a notification determination unit that acquires the route generated by the guidance text generation device and determines timing of notifying the guidance text based on the acquired route and the acquired present location; and an output unit that outputs the guidance text generated by the guidance text generation device at the timing of notifying the guidance text.

A guidance text generation method according to one aspect of the present invention is a guidance text generation method for a guidance text generation device that generates a guidance text for a user, the method including the steps of:

generating a route including nodes from a point of departure to a destination, the nodes being represented by the point of departure, corners or/and ends at which a traveling direction changes and the destination and geographical information including types for classifying things located on a route connecting nodes, the types being classified into at least one of global brands, universal signs/facilities, objects peculiar to Japan, shops/facilities with alphanumeric notation, and shops, facilities, objects that do not fall under any of such categories; and generating a guidance text for the generated route based on the generated route, the geographical information on the generated route, presentation priority of the geographical information associated with the type of the geographical information.

A program according to one aspect of the present invention is a program that causes a computer to function as each unit of the above-described guidance text generation device.

Effects of the Invention

According to the present invention, it is possible to provide guidance using things on a route which are easier to find and in which the user can be more confident during navigation in a situation in which the user is not familiar with the land.

BRIEF DESCRIPTION OF DRAWINGS

FIG. 3 is a diagram illustrating examples of route information.

FIG. 4 is a diagram illustrating examples of geographical information.

FIG. 5 is a diagram illustrating an example of a route generated by the route generation unit.

FIG. 8 is a diagram illustrating examples of guidance texts generated at node 1.

FIG. 9 is a diagram illustrating examples of guidance texts generated at node 2.

FIG. 10 is a diagram illustrating examples of guidance texts generated at node 3.

FIG. 11 is a diagram illustrating examples of priority of geographical information.

FIG. 13 is a diagram illustrating update examples of a guidance text (in the case of a point at which the present location has advanced 70 m from node 1).

DESCRIPTION OF EMBODIMENT

Hereinafter, an embodiment of the present invention will be described based on the accompanying drawings. A guidance device that provides guidance from a point of departure to a destination for foreign visitors to Japan will be described in the present embodiment. As a usage example, a case is assumed where during walking, a foreign visitor to Japan puts the guidance device into a pocket or a bag and receives voice output based on position information from an earphone connected to the guidance device. Note that although an example of voice guidance for foreign visitors to Japan will be described in the present embodiment, the present invention is not limited to voice guidance for foreign visitors to Japan, but the present invention is also applicable to children who cannot read characters, people in a situation that they are not familiar with the land such as travelers visiting foreign countries.

Functional Configuration of Guidance Device

Figure 1:
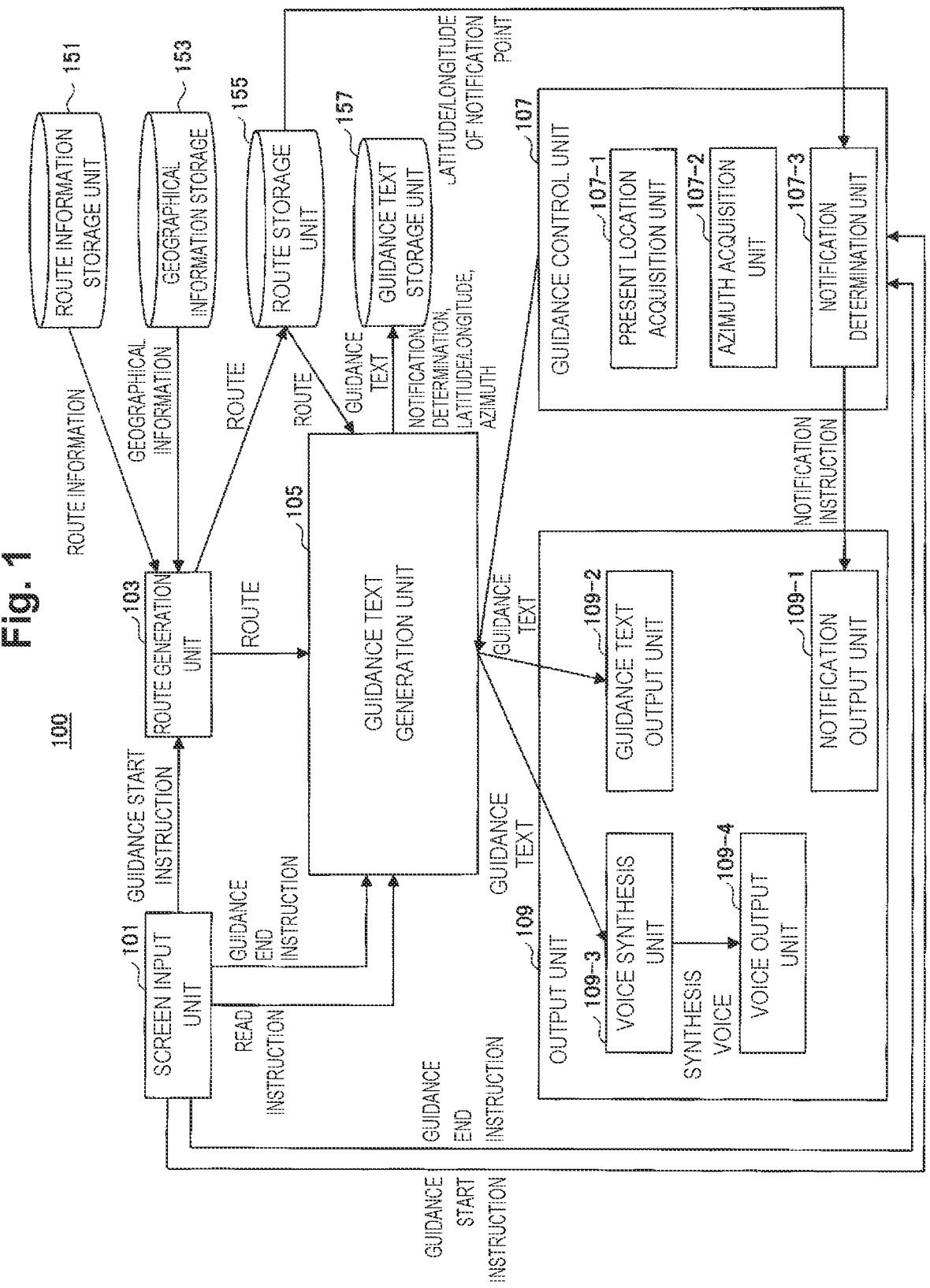
FIG. 1 is a diagram illustrating a functional configuration example of a guidance device according to an embodiment of the present invention.

FIG. 1 is a diagram illustrating a functional configuration example of a guidance device 100 according to an embodiment of the present invention. The guidance device 100 is an device that generates guidance text for a user such as a foreign visitor to Japan, notifies the user at appropriate timing and outputs the guidance text from a point of departure to a destination. In the following description, a point of departure, corners or/and ends at which a traveling direction changes and the destination are represented as nodes. The guidance text includes "text of point of departure," "text of node," "text on the way," "text before node" or the like. The above-described "text of point of departure" is a text that presents, at the point of departure, a traveling direction and a route or the like at each node using geographical information as a landmark. The above-described "text of node" is a text that presents a traveling direction, a route or the like at each node other than the point of departure and the destination, at each node using geographical information as a landmark. The above-described "text on the way" is a text that presents geographical information as a landmark on the way between nodes. The above-described "text before node" is a text that presents a direction of the next turn or the like before a node. The geographical information includes geographical information names representing names of things such as landmarks located on a route connecting nodes, types or the like associated with the geographical information names.

As shown in FIG. 1, the guidance device 100 includes a screen input unit 101, a route generation unit 103, a guidance text generation unit 105, a guidance control unit 107 and an output unit 109 as functional units, and includes a route information storage unit 151, a geographical information storage unit 153, a route storage unit 155 and a guidance text storage unit 157 as storage units. The guidance control unit 107 includes a present location acquisition unit 107-1, an azimuth acquisition unit 107-2 and a notification determination unit 107-3. The output unit 109 includes a notification output unit 109-1, a guidance text output unit 109-2, a voice synthesis unit 109-3 and a voice output unit 109-4.

The screen input unit 101 is always waiting for an input instruction from a user such as a foreign visitor to Japan. Upon receiving a point of departure, a destination or an instruction for indicating guidance starting as input, the screen input unit 101 immediately generates an instruction for causing the route generation unit 103 to generate information on names of the point of departure and the destination (hereinafter, the information on the name of the point of departure is described as "point of departure," the information on the name of the destination is described as "destination") and a route from the point of departure to the destination, and outputs the instruction as a guidance start instruction. Upon receiving an instruction to end the guidance as input, the screen input unit 101 immediately generates an instruction for causing the guidance text generation unit 105 to end the generation of a guidance text and outputs the instruction as a guidance end instruction. Upon receiving an instruction to read the guidance text as input, the screen input unit 101 immediately generates an instruction for causing the guidance text generation unit 105 to output the guidance text from the output unit 109 and outputs the instruction as a read instruction.

The route generation unit 103 receives the guidance start instruction from the screen input unit 101, route information from the route information storage unit 151 and geographical information from the geographical information storage unit 153 as input, and outputs a route from the point of departure to the destination and the geographical information on the route. More specifically, upon receiving the guidance start instruction including the point of departure and the destination as input from the screen input unit 101, the route generation unit 103 generates a route from the point of departure to the destination with reference to the route information storage unit 151 storing the route information and the geographical information storage unit 153 storing the geographical information and stores the route together with the geographical information in the route storage unit 155. The route may be a route that minimizes a walking distance or a route that minimizes the number of turns or the like. More specifically, the route storage unit 155 stores nodes from the point of departure to the destination and geographical information on the route. Furthermore, the generated route is output to the guidance text generation unit 105 as well.

The guidance text generation unit 105 receives the route generated by the route generation unit 103 and the geographical information on the route as input, and outputs a guidance text (text information) of the route. The guidance text generation unit 105 receives a route saved in the route storage unit 155, geographical information on the route and the present location and the azimuth from the guidance control unit 107 as input, updates the guidance text and outputs the updated guidance text. The guidance text generation unit 105 receives the read instruction from the screen input unit 101 as input and outputs the guidance text to the voice synthesis unit 109-3. Furthermore, the guidance text generation unit 105 receives the guidance end instruction from the screen input unit 101 as input and ends the generation of the guidance text.

More specifically, the guidance text generation unit 105 generates a guidance text of a route based on the route generated by the route generation unit 103, geographical information on the route and presentation priority of geographical information set in advance. The presentation priority of geographical information is intended so that things easy to find for the user are included in the guidance text, and the priority is set in advance based on ease of visual recognition of things used for the guidance as will be described in detail hereinafter. The geographical information is classified into at least one of global brands, universal signs/facilities, objects peculiar to Japan, shops/facilities with alphanumeric notation, and shops, facilities and objects that do not fall under any of such categories, for example, structures without name notation, shops/facilities without alphanumeric notation (shops, facilities or the like not expressed in Roman alphabets), roads with characteristic shape, roads with characteristic color or the like. The above-described global brands are shops with a global presence. The above-described universal signs and facilities are toilets, parking lots, parks, police boxes, information, stations, train crossings or the like. The objects peculiar to Japan are temples, shrines or the like. The above-described shops/facilities with alphanumeric notation are shops/facilities with English words, numbers or acronyms or shops/facilities expressed in Roman alphabets that are not English words. One shop/facility or object may belong to a plurality of types. For example, geographical information classified as a type of global brand is easy to find for foreign visitors to Japan and so the presentation priority of the geographical information is set high so that the type of global brand is more likely to be included in the guidance text. On the other hand, geographical information classified as structures without name notation, shops/facilities without alphanumeric notation, roads with characteristic shape, roads with characteristic color or the like is hard to find for foreign visitors to Japan, and so the presentation priority of the geographical information is set low. As for the above-described geographical information, which is hard to find for foreign visitors to Japan, even when a guidance text is presented to the foreign visitors to Japan under the names of geographical information, the guidance text may not be understood, and so the guidance text generation unit 105 generates a guidance text using category, color and/or size of the geographical information. Thus, the presentation priority of geographical information is set in association with the type of geographical information. When one shop/facility or object belongs to a plurality of types, a type with highest priority among the plurality of priorities associated with the plurality of types is used. The presentation priority of geographical information is stored in a priority storage unit (not shown) and is read and used by the guidance text generation unit 105. The presentation priority of geographical information is assumed to be changeable by a priority setting change unit (not shown) in accordance with a level of understanding of Japanese or Japanese culture by the foreign visitors to Japan using the devices. For example, the level of understanding of Japanese or Japanese culture by the foreign visitors to Japan may be classified into five stages, priority may be set for each stage, and the priority setting change unit may allow the foreign visitors to Japan using the devices to select the stage in accordance with their levels of understanding of Japanese or Japanese culture and thereby change the priority to be stored in the priority storage unit. The priority in accordance with each stage means, for example, to increase priorities of shops/facilities with Japanese notation among the objects peculiar to Japan, shops/facilities without alphanumeric notation as the level of understanding of Japanese or Japanese culture increases. The method for changing the presentation priority of geographical information is not limited to this, but each priority may be made settable individually.

When the guidance control unit 107, which will be described later, detects a change of the present location or azimuth, the guidance text generation unit 105 acquires the present location and azimuth from the guidance control unit 107 and updates the guidance text. Note that the guidance text generation unit 105 may update the guidance text at any timing, for example, when an instruction for updating the guidance text is received from the user, when passing through a specific type of geographical information, or when passing through a corner or/and an end. Generation and updating of a guidance text will be described later.

The guidance text generation unit 105 saves the generated guidance text in the guidance text storage unit 157, and upon receiving a notification determination from the guidance control unit 107, the guidance text generation unit 105 reads the guidance text from the guidance text storage unit 157 at the time of reception, and outputs the guidance text to the guidance text output unit 109-2 and the voice synthesis unit 109-3. Upon receiving a read instruction from the screen input unit 101, the guidance text generation unit 105 acquires the guidance text from the guidance text storage unit 157 at the time of reception and outputs the guidance text to the voice synthesis unit 109-3. Furthermore, upon receiving a guidance end instruction from the screen input unit 101, the guidance text generation unit 105 ends the generation of a guidance text at the time of reception.

The guidance control unit 107 is constructed of the present location acquisition unit 107-1, the azimuth acquisition unit 107-2 and the notification determination unit 107-3. The guidance control unit 107 receives a guidance start instruction and a guidance end instruction from the screen input unit 101 as input and outputs a notification determination indicating timing of notifying the user of the present location of the user, the azimuth and the guidance text. Upon receiving the guidance start instruction from the screen input unit 101, the guidance control unit 107 outputs the user's present location and azimuth to the guidance text generation unit 105 at a predetermined time interval until a guidance end instruction is received and determines timing of notifying the guidance text based on the route saved in the route storage unit 155 and the user's present location and azimuth.

The present location acquisition unit 107-1 receives the guidance start instruction and the guidance end instruction from the screen input unit 101 as input and outputs the present location. The present location acquisition unit 107-1 acquires the user's present location (e.g., latitude, longitude) at a predetermined time interval and outputs the present location to the notification determination unit 107-3. The present location acquisition unit 107-1 can acquire the present location, for example, with GPS. Upon detecting a change in the present location, the present location acquisition unit 107-1 outputs the present location to the guidance text generation unit 105 to update the guidance text. The predetermined time interval here is set to 1 second to enable the distance to be updated at a 1 m interval, for example, when walking at 1 m per second. "When a change in present location is detected" is assumed to be when, for example, a distance corresponding to the difference from the present location acquired last time exceeds a predetermined threshold. The "predetermined threshold" is assumed to be 1 m to update the distance, for example, at a 1 m interval.

The azimuth acquisition unit 107-2 receives the guidance start instruction and the guidance end instruction from the screen input unit 101 as input and outputs an azimuth. The azimuth acquisition unit 107-2 acquires the user's azimuth (e.g., the user's orientation) and outputs the user's azimuth to the notification determination unit 107-3. The azimuth acquisition unit 107-2 can estimate the user's traveling direction from, for example, a change in the present location and determine the azimuth by assuming that the user is facing the traveling direction. Upon detecting a change in the azimuth, the azimuth acquisition unit 107-2 outputs the azimuth to the guidance text generation unit 105 to update the guidance text. "Upon detecting a change in the azimuth" is assumed to be, for example, when an angle corresponding to the difference from the azimuth acquired last time exceeds a predetermined threshold. The predetermined angle is, for example, 30°, an angle corresponding to 1 hour assuming an expression in a clock position (direction obtained from division by 12 equal parts according to the orientation of the short hour hand of an analog clock).

The notification determination unit 107-3 receives the present location from the present location acquisition unit 107-1, the azimuth from the azimuth acquisition unit 107-2 and the route saved in the route storage unit 155 as input, and outputs a notification determination indicating timing of notifying a guidance text and a notification instruction. The notification determination unit 107-3 compares the user's present location acquired by the present location acquisition unit 107-1 with the notification point on the route, determines whether the user's present location is the notification point on the route or not, and if the user's present location is the notification point on the route, the notification determination unit 107-3 determines that the user needs to be notified. Examples of the above-described notification point include each node, a point 20 m before a node other than the point of departure and a point on the way between nodes 10 m before geographical information as a landmark. Upon determining that the user needs to be notified, the notification determination unit 107-3 outputs a notification determination to the guidance text generation unit 105 and outputs a notification instruction, which is an instruction for causing the notification output unit 109-1 to output notification sound, light, vibration or the like.

The output unit 109 is constructed of the notification output unit 109-1, a guidance text output unit 109-2, the voice synthesis unit 109-3 and the voice output unit 109-4. The output unit 109 receives a notification instruction from the notification determination unit 107-3 and a guidance text output from the guidance text generation unit 105 as input and outputs a notification that a guidance text is output and a guidance text. When the guidance text generation unit 105 outputs the guidance text to the voice synthesis unit 109-3 in response to a read instruction, the output unit 109 outputs the guidance text acquired from the guidance output unit 109-4 by voice.

The notification output unit 109-1 receives a notification instruction from the notification determination unit 107-3 as input and outputs notification sound, light, vibration or the like. The user can recognize timing of receiving a guidance text with notification sound, light, vibration or the like and input a read instruction to the screen input unit 101 so that the user can listen to the guidance text even at a point other than the notification point on the route.

The guidance text output unit 109-2 receives a guidance text from the guidance text generation unit 105 as input and outputs (displays) the guidance text received from the guidance text generation unit 105 on the screen.

The voice synthesis unit 109-3 receives the guidance text from the guidance text generation unit 105 as input, generates a synthesis voice signal from the guidance text received from the guidance text generation unit 105 in response to a read instruction and outputs the synthesis voice signal.

The voice output unit 109-4 receives the synthesis voice signal from the voice synthesis unit 109-3 as input and outputs the synthesis voice.

Processing Procedure of Guidance Device

Hereinafter, a processing procedure executed by the guidance device 100 will be described further.

Figure 2:
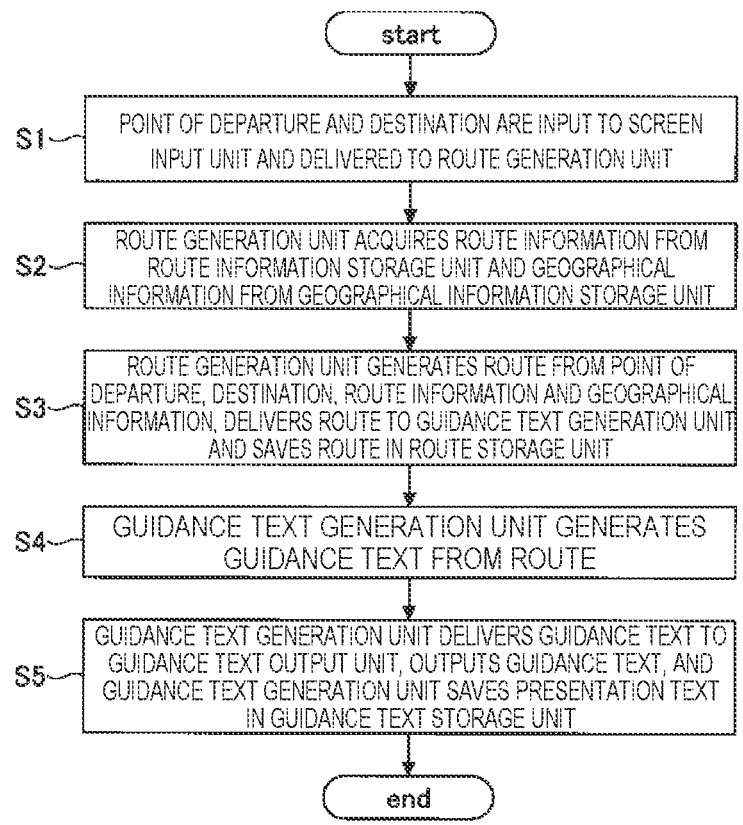
FIG. 2 is a flowchart (No.1) illustrating an example of a processing procedure executed by the guidance device.

FIG. 2 is a flowchart illustrating an example of the processing procedure executed by the guidance device 100. The flowchart in FIG. 2 illustrates a processing procedure executed by the guidance device 100 only at an initial time, when the guidance device 100 generates and saves a guidance text in response to a guidance start instruction.

In step S1, the screen input unit 101 receives names of a point of departure and a destination as input, and outputs a guidance start instruction, which is an instruction for generating a route from the point of departure to the destination to the route generation unit 103. Note that the input method may be keyboard input, voice input (input voice is converted to text information by voice recognition) or other input methods.

In step S2, the route generation unit 103 acquires route information from the route information storage unit 151 according to the point of departure and the destination, and acquires geographical information from the geographical information storage unit 153. FIG. 3 illustrates an example of route information and FIG. 4 illustrates an example of geographical information. The route information includes route names, points of departure, destinations, latitudes and longitudes of nodes included from the point of departure to the destination. The geographical information stores geographical information names, information relating to expression in Roman alphabets, types of geographical information, categories, colors, sizes, lines/points, latitudes and longitudes, left/right, and orientation. The information relating to "expression in Roman alphabets" is an attribute showing whether labeling such as a signboard presenting a geographical information name is expressed in Roman alphabets and English words (corresponding to "English words") or expressed in Roman alphabets but other than English words (corresponding to "Expressed in Roman alphabets") or other than expression in Roman alphabets (corresponding to "none"). Since numbers ("123") and acronyms ("NNN") expressed in Roman alphabets are visually recognizable in the same way as English words, they are handled as English words. The "type" of the geographical information is classification used to limit geographical information to be presented to foreign visitors to Japan. The geographical information in the present embodiment is classified into "types" such as "global brand," "universal sign/facility," "object peculiar to Japan," "shop/facility expressed in Roman alphabets (English words)," "shop/facility expressed in Roman alphabets (other than English words)," "structure," "shop/facility other than those expressed in Roman alphabets," "road with characteristic shape" and "road with characteristic color." The above-described "global brand" represents a fast food shop, cafe, game center or the like with a global presence. The above-described "universal sign/facility" represents a sign or facility that is common throughout the world such as a toilet, parking lot, park, police box, information, station, train crossing. The above-described "object peculiar to Japan" represents a temple, shrine or the like peculiar to Japan, but also represents a world-renowned thing. The above-described shop/facility expressed in Roman alphabets (English words)" represents a shop/facility, the name of which includes English words, numbers, acronyms ("Hello," "Apple," "Red," "123," "NNN" or the like). The above-described "shop/facility expressed in Roman alphabets (other than English words)" represents a shop/facility that is expressed in Roman alphabets, the name of which includes characters that are expressed in Roman alphabets but are not English words ("Ohayo," "Ringo," "Shibuya" or the like). The above-described "structure" represents a gate, tower, object or the like without name notation. The above-described "shop/facility not expressed in Roman alphabets" represents shop/facility, the name of which includes characters not expressed in Roman alphabets such as Japanese or Chinese ("Ohayo," "Sushi," "Ramen" or the like). The above-described "road with characteristic shape" represents characteristic shape of a road such as a staircase or slope. The above-described "road with characteristic color" represents characteristic color of a road such as green belt, school zone, color pavement. When certain geographical information can be classified into a plurality of types such as shop/facility, which is a global brand and expressed in Roman alphabets (English words), the "type" of the geographical information can include a plurality of types. Note that the above-described classification is merely an example and the type of geographical information may be classified into, for example, "global brand," "universal sign/facility," "object peculiar to Japan," "shop/facility with alphanumeric notation" (including above-described "shop/facility expressed in Roman alphabets (English words)" and "shop/facility expressed in Roman alphabets (other than English words)"), "shop/facility or object that does not fall into any of these categories" (including above-described "structure," "shops/facilities other than those expressed in Roman alphabets," "road with characteristic shape" and "road with characteristic color" or the like). The "category" corresponds to a subcategory of a type of geographical information and is an attribute representing a classification corresponding to articles sold at shops or the like. The "color" is an attribute representing a color occupying a largest area of labeling of a signboard or the like. The "size" is an attribute representing a size of labeling such as a signboard. The present embodiment uses two stages of size, labeling having an area of less than 1 m² is considered "small," and labeling having sizes of 1 m² or larger is considered "large," but the number of stages or a reference value thereof is not limited to this. The "line/point" is an attribute representing whether the geographical information exists at one point on a link between nodes (corresponding to a "point") or continuously exists over a whole or part of a segment of a link between nodes (corresponding to a "line"). Thus, steps and green belts or the like are expressed by lines. The "latitude/longitude" is position information representing a center of a place in which geographical information exists. The "left/right" and the "orientation" represent on which of the left side or the right side, the geographical information is located or which way the slope is oriented when the geographical information is seen from a prescribed direction. Note that although the present embodiment assumes geographical information outdoors, an object such as an escalator or elevator is registered in a map such as a guide map or objects outputting signs such as sound or light may be used as geographical information indoors. In step S2, the route generation unit 103 acquires routes that match the point of departure and the destination from the route information storage unit 151 respectively, and acquires geographical information located on the route from the geographical information storage unit 153 according to the latitude/longitude of the route.

In step S3, the route generation unit 103 generates a route from the point of departure, the destination, the route information and the geographical information. FIG. 5 illustrates an example of routes generated by the route generation unit 103. The route includes nodes from the point of departure to the destination and geographical information on the way. Note that since the present embodiment assumes to guide turn directions for foreign visitors to Japan, corners or/and ends where a traveling direction changes are handled as nodes, but corners where a traveling direction does not change (that is, corners to go straight) are not handled as nodes, but handled in the same way as the geographical information. The "shape of a node," the "distance to the next node," the "direction of the next turn," the "left/right" and the "orientation" are calculated from the "latitude/longitude" of the node or geographical information and the traveling direction based thereon. The "shape of a node" is described only at a node point and a corner point, the "direction of the next turn" is described only at a node point, the "left/right" is described only at a geographical information point and the "orientation" is described only at a geographical information point including the information. Note that the "notification point" is a point that needs to be notified to foreign visitors to Japan and it is assumed here that all nodes need to be notified. A generated route is output by the route generation unit 103 to the guidance text generation unit 105 and is saved in the route storage unit 155.

In step S4, the guidance text generation unit 105 generates a guidance text from the route. A flowchart for generating a guidance text will be described later with reference to FIG. 7.

In step S5, the guidance text generation unit 105 outputs the guidance text to the output unit 109. At this time, the guidance text output unit 109-2 outputs the guidance text to a screen of a smartphone or the like, the voice synthesis unit 109-3 generates a synthesis voice signal and the voice output unit 109-4 automatically reads it by voice. The guidance text is saved in the guidance text storage unit 157. Note that the guidance text may be output directly to the screen of the smartphone or the like, or a button such as "voice read" may be displayed instead and an instruction to read a guidance text may be received by pressing a button (touching a position corresponding to the button on a touch panel screen) or a button or the like for receiving an instruction to read a guidance text while directly outputting the instruction on the screen may be displayed. The button may be set so as to show a whole guidance text display region on the smartphone, for example. When the instruction to read the guidance text is received, operation is performed, which is similar to the operation when the instruction to read the guidance text is input to the screen input unit 101.

Figure 6:
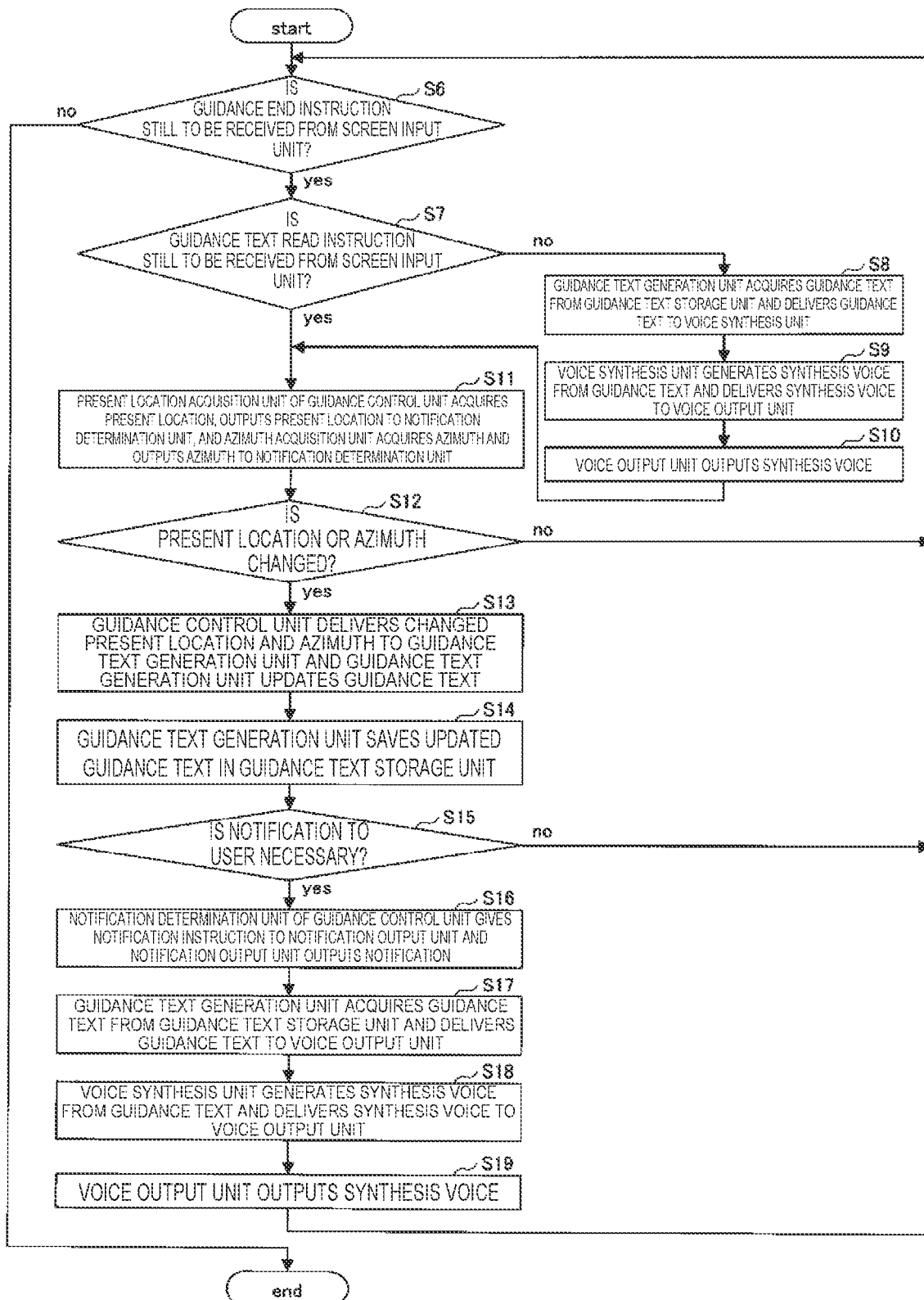
FIG. 6 is a flowchart (No.2) illustrating an example of a processing procedure executed by the guidance device.

FIG. 6 is a flowchart illustrating an example of a processing procedure executed by the guidance device 100. FIG. 6 illustrates a whole processing procedure executed by the guidance device 100 after executing the processing in FIG. 2, when performing notification and executing a read instruction at timing when the guidance text needs to be presented, presenting a guidance text in response to a read instruction at any timing and updating the guidance text according to position information.

In step S6, it is determined whether the guidance text generation unit 105 has received a guidance end instruction from the screen input unit 101 or not. It is determined, for example, whether a guidance end button on the screen is pressed or whether a guidance end instruction is executed by a voice command. When the guidance end instruction has not been received, the flow proceeds to step S7 or the processing ends when the guidance end instruction has been received.

Next in step S7, it is determined whether the guidance text generation unit 105 has received an instruction to read the guidance text from the screen input unit 101. For example, it is determined whether the guidance text display region of the smartphone has been touched or not. When a read instruction has been received, the flow proceeds to step S8 and when no read instruction has been received, the flow proceeds to step S11.

In step S8, the guidance text generation unit 105 acquires the guidance text, a read instruction of which has been received, from the guidance text storage unit 157 and outputs the guidance text to the voice synthesis unit 109-3.

In step S9, the voice synthesis unit 109-3 generates a synthesis voice signal from the guidance text, which has been input from the guidance text generation unit 105, and outputs the synthesis voice signal to the voice output unit 109-4. Note that any synthesis system may be used as the voice synthesis system.

In step S10, the voice output unit 109-4 outputs a synthesis voice, which is a synthesis voice signal input from the voice synthesis unit 109-3 and converted to sound. The synthesis voice is output from a speaker of a smartphone, an earphone or a headphone or the like. Next, the flow proceeds to step S11.

In step S11, the present location acquisition unit 107-1 of the guidance control unit 107 acquires the present location at a predetermined time interval, outputs the present location to the notification determination unit 107-3, and the azimuth acquisition unit 107-2 acquires the azimuth at a predetermined time interval and outputs the azimuth to the notification determination unit 107-3.

In step S12, the guidance control unit 107 determines whether either one or both of the present location and the azimuth has(have) changed. When neither of the two has changed, the flow returns to step S6 and when either one of the two has changed, the flow proceeds to step S13.

In step S13, the guidance control unit 107 outputs the changed present location and azimuth to the guidance text generation unit 105 and the guidance text generation unit 105 updates the guidance text. A flowchart for updating the guidance text will be described later with reference to FIG. 12.

In step S14, the guidance text generation unit 105 saves the updated guidance text in the guidance text storage unit 157.

In step S15, the notification determination unit 107-3 determines whether notification to the user is necessary or not. Whether notification of a point is necessary or not is determined from a latitude/longitude of a node on the route. Points requiring notification are all nodes, a point 20 m before a node other than the point of departure, and a point 10 m before geographical information as a landmark if there exists geographical information as a landmark on the way between nodes. Note that a distance from a node to a notification point before the node and a distance from the geographical information as a landmark on the way to the notification point before the geographical information can be set by the user individually and arbitrarily. It is preferable that a node or geographical information as a landmark come into view from the user's standing position. However, when roads at an intersection are wide, it is necessary to set a distance from a node to the notification point before the node in order to prevent the notification point before the node from overlapping the node point. The notification determination unit 107-3 compares the present location with the point requiring notification, proceeds to step S16 if notification is necessary (that is, when the user has reached any one node, and/or when the user has reached 20 m before a node other than the point of departure and/or when the user has reached 10 m before geographical information as a landmark on the way), or returns to step S6 when notification is not necessary.

In step S16, the notification determination unit 107-3 of the guidance control unit 107 gives a notification instruction to the notification output unit 109-1, and the notification output unit 109-1 outputs a notification. For example, the notification is output as notification sound, light or vibration of the smartphone. Note that the notification may be stopped, for example, a predetermined time later or stopped by a foreign visitor to Japan operating the screen or stopped by detecting that the foreign visitor to Japan stands still. After outputting the notification, the flow proceeds to step S17. Note that when 20 m before the node overlaps 10 m before the geographical information as a landmark on the way, for example, when the geographical information as a landmark on the way exists 11 m before the node, the notification points are close to each other, in which case both are notified in order two times in total.

In step S17, the guidance text generation unit 105 acquires the guidance text from the guidance text storage unit 157 and outputs the guidance text to the voice synthesis unit 109-3.

In step S18, the voice synthesis unit 109-3 generates a synthesis voice signal from the guidance text input from the guidance text generation unit 105 and outputs the synthesis voice signal to the voice output unit 109-4. Note that any synthesis system may be used as the voice synthesis system.

In step S19, the voice output unit 109-4 converts the synthesis voice signal input from the voice synthesis unit 109-3 to a sound and outputs the converted synthesis voice. The synthesis voice is output from, for example, a speaker of the smartphone, an earphone or a headphone. Next, the flow returns to step S6, and the processing continues unless receiving a guidance end instruction in step S6 and thereafter.

Note that although FIG. 6 is described as a flowchart of a series of operations by the guidance device 100, some processes are executed in parallel. For example, the processes in step S11 to step S19 are executed simultaneously even during execution of steps S7 to S10.

Generation of Guidance Text

Figure 7:
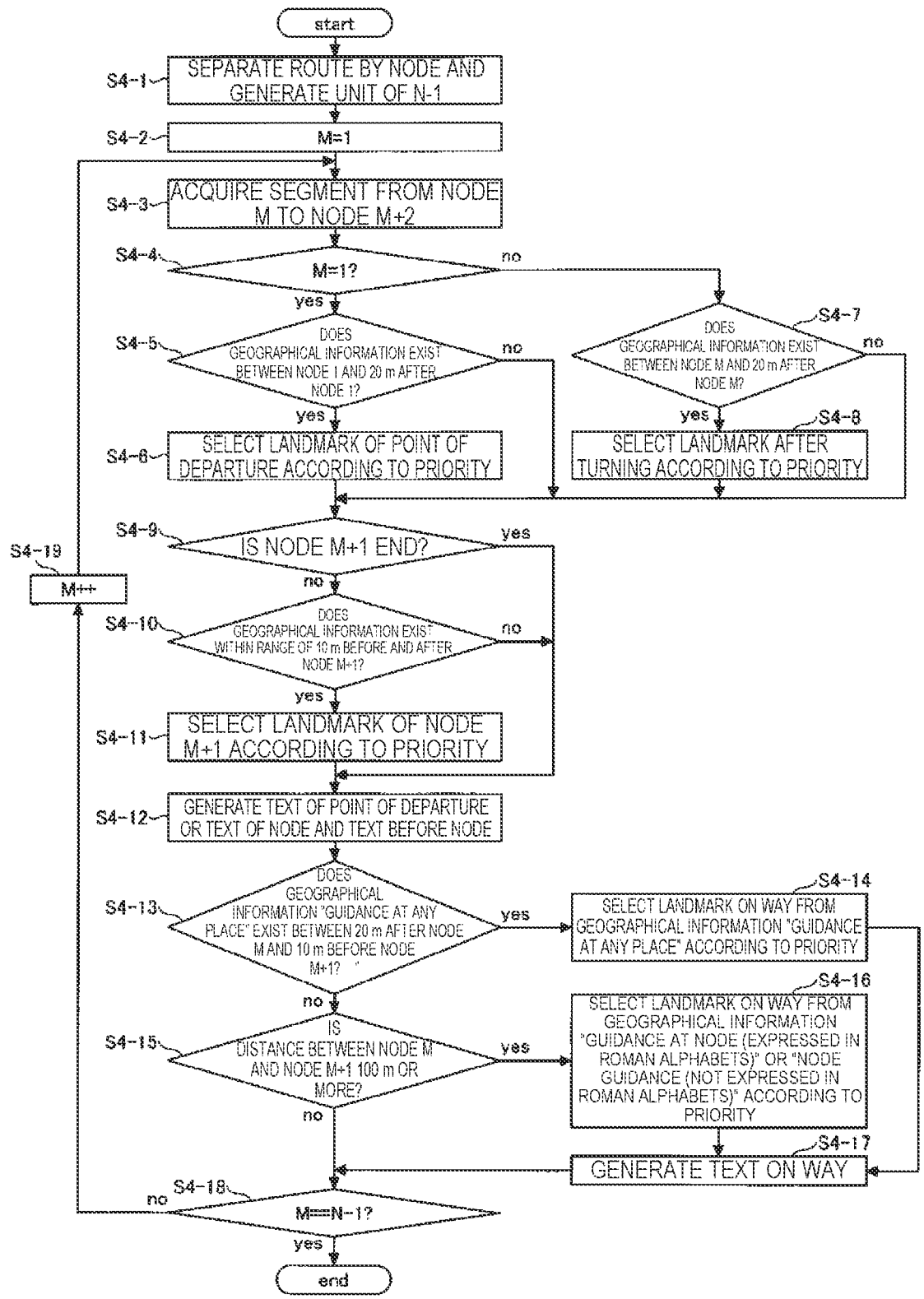
FIG. 7 is a flowchart illustrating an example of a processing procedure for generating a guidance text.

Next, generation of a guidance text by the guidance text generation unit 105 in step S4 in FIG. 2 will be described. FIG. 7 is a flowchart illustrating an example of a processing procedure for generating a guidance text.

First, in step S4-1, the guidance text generation unit 105 divides a route node by node such as from node 1 to node 2, from node 2 to node 3, . . . , from node M to node M+1, . . . , from node N−1 to node N (M<N, M is an integer equal to or greater than 1, N is an integer equal to or greater than 2), to thereby generate N−1 segments for N nodes. One segment here means a segment between a certain node and another node adjacent to the node, one node ahead in the traveling direction.

In step S4-2, variable M representing a segment for which a guidance text is generated is set to 1.

In step S4-3, the guidance text generation unit 105 acquires two segments from node M to node M+2. However, when M+2>N, the guidance text generation unit 105 acquires one segment from node M to node M+1. For example, when M=1, as shown in FIG. 8, a segment from node 1 to node 3 is acquired from the route in FIG. 5. Note that in later step S4-20, M is incremented and when M=2, a segment from node 2 to node 4 is acquired as shown in FIG. 9, and when M=3, a segment from node 3 to node 4 is acquired as shown in FIG. 10. Note that although an example will be described in the present embodiment where two segments between nodes on a route are acquired at each node assuming that geographical information as a landmark at the next node is guided, the number of segments acquired is not limited to 2, but one segment or three or more segments may be acquired.

In step S4-4, in order to determine whether it is necessary to generate a text of the point of departure or not, the guidance text generation unit 105 determines whether M=1 or not. The "text of the point of departure" is a text including a text to fix a traveling direction and a text to guide the route to the next node. A more specific example will be described later. If M=1, the flow proceeds to step S4-5, and if M≠1, the flow proceeds to step S4-7.

In step S4-5, the guidance text generation unit 105 determines whether geographical information exists within a range from node 1 to 20 m after node 1 (20 m after passing through node 1 in the traveling direction) or not. When the geographical information exists, the flow proceeds to step S4-6, and when the geographical information does not exist, the flow proceeds to step S4-9. Note that the range to determine whether the geographical information exists or not is preferably within 20 m after node 1 so that the geographical information comes into view when standing at the point of node 1, but any value may be used as long as the geographical information falls within the range to the next node. The number of pieces of geographical information to be acquired is not limited to one, but a plurality of pieces of geographical information may be acquired. When the plurality of pieces of geographical information are acquired, the guidance text generation unit 105 may generate a guidance text using a relationship of geographical information such as distances between the plurality of acquired pieces of geographical information.

In step S4-6, the guidance text generation unit 105 selects geographical information as a landmark for the point of departure from among the pieces of geographical information within the range from node 1 to 20 m after node 1 according to the presentation priority of geographical information. When a plurality of pieces of geographical information exist within the range from node 1 to 20 m after node 1, geographical information with a smallest priority number, that is, with a highest priority is selected. FIG. 11 illustrates examples of presentation priority of geographical information. The presentation priority of geographical information is set in association with a type of geographical information. For example, the priority is set based on ease of visual recognition of the geographical information, in order of a global brand, universal sign/facility, object peculiar to Japan, shop/facility expressed in Roman alphabets (English words), shop/facility expressed in Roman alphabets (other than English words), structure, shop/facility not expressed in Roman alphabets, road with characteristic shape and road with characteristic color. FIG. 11 illustrates only priority examples, priorities different from the priorities in FIG. 11 may be set or the same priority may be set for a plurality of types of pieces of geographical information. The "classification" set for priority of geographical information indicates whether the geographical information is geographical information that can be used for a text of a point of departure, a text of a node, a text before a node or a text on the way (corresponding to "guidance at any place") or geographical information that cannot be used for a text on the way in principle, but can be used for a text of a point of departure, a text of a node or a text before a node (corresponding to "guidance at node"). The geographical information classified as the "guidance at node" is not used for a text on the way in principle, but can be used for a text on the way when it is assumed that when foreign visitors to Japan cannot find geographical information classified as a guidance at any place on the way between nodes and become anxious while walking without any landmark. The "guidance at node" is further classified as "guidance at node (expressed in Roman alphabets)" and "guidance at node (not expressed in Roman alphabets)" depending on the presence or absence of expression in Roman alphabets. In the case in FIG. 8, since only "○○ camera" exists within a range from node 1 to 20 m after node 1, information on the "○○ camera" is acquired and the flow proceeds to step S4-9. Note that the type of geographical information, presentation priority and classification of geographical information is based on investigation results on foreign visitors to Japan in the present embodiment. The presentation priority and classification of geographical information may also be set based on the ease of visual recognition of things used for guidance, and high presentation priorities are set for geographical information including character information, geographical information with high visual attraction with their colors and sizes. Depending on the level of understanding of Japanese and Japanese culture of foreign visitors to Japan using the devices, the foreign visitors to Japan themselves may be enabled to set or change presentation priority and classification of geographical information.

In step S4-7, the guidance text generation unit 105 determines whether geographical information as a landmark after turning node M exists within a range from node M to 20 m after node M. When the geographical information exists, the flow proceeds to step S4-8 or the flow proceeds to step S4-9 when the geographical information does not exist. Note that the range to determine whether the geographical information exists or not is preferably within 20 m after node M so that the geographical information comes into view when the user stands facing the direction of node M+1 at the point of node M, but any value may be used as long as the geographical information exists within the range from node M to node M+1. The number of pieces of the acquired geographical information is not limited to one, but a plurality of pieces of geographical information may be acquired. When a predetermined number of, for example, two pieces of geographical information are acquired, geographical information with highest priority is selected first. When a plurality of pieces of geographical information are acquired, the guidance text generation unit 105 may generate a guidance text using a relationship between pieces of geographical information such as distances among a plurality of pieces of acquired geographical information.

In step S4-8, the guidance text generation unit 105 selects geographical information as a landmark after turning from among pieces of geographical information within a range from node M to 20 m after node M according to the priority in FIG. 11. When a plurality of pieces of geographical information exist within a range from node M to 20 m after node M, geographical information with a smallest priority number, that is, with a highest priority is selected. In the case in FIG. 9, since only "○○ Sushi" exists within a range from node 2 to 20 m after node 2, information on the "○○ Sushi" is acquired and the flow proceeds to step S4-9. In the case in FIG. 10, although "○○ Drug" and "xx Sushi" exist within a range from node 3 to 20 m after node 3, their priorities are the same, and so the two pieces of geographical information are acquired as they are and the flow proceeds to step S4-9.

In step S4-9, the guidance text generation unit 105 determines whether node M+1 corresponds to an end or not. When node M+1 is an end, the flow proceeds to step S4-12 without acquiring geographical information as a landmark for a corner. In a case in FIG. 9, since the shape of node 3 corresponds to an end, the geographical information as a landmark for a corner is not acquired. When the shape of node 3 does not correspond to an end, the flow proceeds to step S4-10.

In step S4-10, the guidance text generation unit 105 determines whether geographical information as a landmark for node M+1 exists within a range from 10 m before node M+1 to 10 m after node M+1 or not. When the geographical information exists within the range, the flow proceeds to step S4-11 and when the geographical information does not exist, the flow proceeds to step S4-12. Note that the range to determine whether the geographical information exists or not is preferably within 10 m before and after node M+1 so that the geographical information comes into view when the user stands at a point 10 m before node M+1, but any value may be used within a range in which geographical information comes into view when the user stands at any point within a range from node M to node M+1. The number of pieces of geographical information to be acquired is not limited to one, but a plurality of pieces of geographical information may be acquired. When a plurality of pieces of geographical information are acquired, the guidance text generation unit 105 may generate a guidance text using a relationship between pieces of geographical information such as distances among the plurality of pieces of acquired geographical information.

In step S4-11, the guidance text generation unit 105 selects geographical information as a landmark for node M+1 from among pieces of geographical information within a range from 10 m before node M+1 to 10 m after node M+1 according to the priority in FIG. 11. When a plurality of pieces of geographical information exist within a range from 10 m before node M+1 to 10 m after node M+1, geographical information with a smallest priority number, that is, with a highest priority is selected. In the case in FIG. 8, although "post office" and "○○ Sushi" exist within a range from 10 m before node 2 to 10 m after node 2, the "post office" which belongs to shops/facilities expressed in Roman alphabets (English words) has a higher priority than the "00 Sushi," and so information on the "post office" is acquired and the flow proceeds to step S4-12. In a case in FIG. 10, since no geographical information exists within a range from 10 m before node 4 to 10 m after node 4, the flow proceeds to step S4-12 without acquiring geographical information in step S4-9.

Note that geographical information of a type with a smallest priority number is selected as the geographical information as a landmark for a point of departure, geographical information as a landmark for node M+1 and geographical information as a landmark after turning node M. At this time, when a plurality of pieces of geographical information having the same geographical information name exist within the same link (straight line from node M to M+1), for example, when a plurality of parking lots exist from node M to node M+1, those parking lots are not selected as the geographical information as a landmark. This is because when a plurality of pieces of geographical information having the same geographical information name exist within a view, it is not possible to uniquely determine which the geographical information as a landmark is. When a plurality of pieces of geographical information of a type with a smallest priority number exist, a predetermined number of pieces of geographical information may be selected or the geographical information closest to the node may be selected.

In step S4-12, the guidance text generation unit 105 generates a text of the point of departure or a text of the node and a text before the node.

The text of the point of departure is a text that is always presented first when the guidance device 100 is started and a guidance start instruction is input, and includes a text to fix a traveling direction and a text to guide a route to the next node. First, in step S4-6, when the geographical information as a landmark for the point of departure is selected first, the text to fix the traveling direction is generated using the geographical information. For example, in the case in FIG. 8, the "○○ camera" is selected as a landmark, but since the type of the geographical information is a shop/facility not expressed in Roman alphabets, the "○○ camera" is expressed as an "electric shop with a large red signboard" and a text "Please stand with the electric shop with a large red signboard to your left" is generated. Next, when geographical information as a landmark for node M+1 is selected in step S4-11, a text to guide a route to the next node is generated using the geographical information. The text of the route is a text that suggests how far to go, at which corner, and in which direction to turn. For example, in the case in FIG. 8, a text is generated, using the "post office" as a landmark, which goes like: "go straight to the second corner on the left side and turn left in the corner where the post office is to your right." The text of the point of departure may include a text indicating a time required like "You will be arriving at your destination in five minutes."

The text of the node is a text that is presented after the notification determination unit 107-3 outputs a notification instruction when the user's present location is located at a point of each node other than the point of departure. The text of the node includes a text to fix the traveling direction after turning at the node and a text to guide a route to the next node. First, in step S4-8, when geographical information as a landmark after turning is selected, a text to fix the traveling direction after turning is generated using the geographical information. For example, in the case in FIG. 9, a text is generated, using "○○ Sushi" as a landmark after turning, which goes like: "turn left here and then you will see the ○○ Sushi to your right." Next, in step S4-11, when geographical information as a landmark for node M+1 is selected, a text to guide a route to the next node is generated using the geographical information. For example, in the case in FIG. 9, since node 3 is an end and the geographical information as a landmark for node 3 is not selected, and so a text is generated, which goes like: "Next, go straight to the end and turn right." In a case in FIG. 10, "○○ Drug" and "xx Sushi" are selected as landmarks after turning, but since the type of the geographical information is a shop/facility not expressed in Roman alphabets, the "○○ Drug" is expressed as a "drugstore with a large orange signboard" and the "xx Sushi" is expressed as a "Sushi shop with a small black signboard" and a text is generated, which goes like: "After turning left here, you will see a drugstore with a large orange signboard to your right and a Sushi shop with a small black signboard to your left." Since geographical information as a landmark for node 4, which is the destination, is not selected, a text is generated, which goes like: "Next, go straight 90 m, then you will find your destination to your right."

The text before a node is a text presented by the notification determination unit 107-3 after outputting a notification instruction when the user's present location is located at a point 20 m before each node other than the point of departure. In step S4-11, when the geographical information as a landmark for node M+1 is selected, a text of a node is generated using the geographical information. For example, in the case in FIG. 8, a text is generated, using the "post office" as a landmark, which goes like: "you will soon turn left in the corner where you find the post office to your right." In the case in FIG. 9, since node 3 is an end and the geographical information as a landmark for node 3 is not selected, a text is generated, which goes like: "You will soon turn right at the end." In the case in FIG. 10, since geographical information as a landmark for node 4, which is the destination, is not selected, a text is generated, which goes like: "You will soon find your destination to your right." When the text is generated, the flow proceeds to step S4-13.

In step S4-13, the guidance text generation unit 105 determines whether geographical information of classification of "guidance at any place" in FIG. 11 exists within a range from 20 m after node M to 10 m before node M+1 or not. When the geographical information exists, the flow proceeds to step S4-14, and when the geographical information does not exist, the flow proceeds to step S4-15. Note that the number of pieces of acquired geographical information is not limited to one, but a plurality of pieces of geographical information may be acquired. When a plurality of pieces of geographical information are acquired, the guidance text generation unit 105 may generate a guidance text using a relationship between pieces of geographical information such as distances among the plurality of pieces of acquired geographical information.

In step S4-14, the guidance text generation unit 105 selects the geographical information as a landmark on the way from the geographical information of classification of "guidance at any place" according to the priority in FIG. 11. When a plurality of pieces of geographical information of classification of "guidance at any place" exist, geographical information with a smallest priority number, that is, with a highest priority is selected. In the case in FIG. 8, since only the "○○ Cafe" is geographical information of classification of "guidance at any place" located from 20 m after node 1 to 10 m before node 2, information on the "○○ Cafe" is acquired and the flow proceeds to step S4-17.

In step S4-15, the guidance text generation unit 105 determines whether a distance from node M to node M+1 is equal to or greater than 100 m or not. When the distance is equal to or greater than 100 m, the flow proceeds to step S4-16 and when the distance is less than 100 m, the flow proceeds to step S4-18. Note that although 100 m is assumed to be a reference for a distance within which foreign visitors to Japan may become anxious while walking without any landmark, the value of the distance used in step S4-15 is not limited to this.

In step S4-16, the guidance text generation unit 105 selects geographical information as a landmark on the way from the geographical information of "guidance at node (expressed in Roman alphabets)" or "guidance at node (not expressed in Roman alphabets)" according to the priority in FIG. 11. When a plurality of pieces of geographical information of classification of "guidance at node (expressed in Roman alphabets)" or "guidance at node (not expressed in Roman alphabets)" exist, geographical information with a smallest priority number, that is, with a highest priority is selected in the case of "guidance at node (expressed in Roman alphabets)." Up to two pieces of geographical information with a smallest priority number, that is, with a highest priority are selected in the case of "guidance at node (not expressed in Roman alphabets)." The reason that up to two pieces of geographical information with a high priority are selected in the case of "guidance at node (not expressed in Roman alphabets)" is that the geographical information of "guidance at node (not expressed in Roman alphabets)" is difficult for foreign visitors to Japan to recognize and the foreign visitors to Japan may not be able to understand the guidance with only one piece of geographical information. Note that in the case of "guidance at node (not expressed in Roman alphabets)," an upper limit of the number of selectable pieces of geographical information is not limited to two, but can be one or three or more. In the case in FIG. 9, "○○ Shoes" is classification of "guidance at node (expressed in Roman alphabets)" and exists within a range from 20 m after node 2 to 10 m before node 3, and so information on the "○○ Shoes" is acquired and the flow proceeds to step S4-17.

As described above, as the geographical information as a landmark on the way, geographical information of a type with a smallest priority number among classifications of "guidance at any place" is selected. When the geographical information of "guidance at any place" does not exist or when the length of the link is 100 m or more, geographical information of a type with a smallest priority number among classifications of "guidance at node (expressed in Roman alphabets)" is selected. When even the geographical information of "guidance at node (expressed in Roman alphabets)" does not exist either, up to two pieces of geographical information of a type with a smallest priority number among classifications of the "guidance at node (not expressed in Roman alphabets)" are selected. At this time, when a plurality of pieces of geographical information having the same geographical information name within the same link exist, those pieces of geographical information are not selected as the geographical information as a landmark on the way. When there are a plurality of pieces of geographical information of a type with a smallest priority number, a predetermined number of pieces of geographical information may be selected or those pieces of geographical information closest to the user's present location may be selected.

In step S4-17, the guidance text generation unit 105 generates a text on the way. The text on the way is a text presented after the notification determination unit 107-3 outputs a notification instruction when the user's present location is at a point 10 m before the point at which the geographical information as a landmark on the way exists. In step S4-14 or S4-16, when the geographical information as a landmark on the way is selected, a text on the way is generated using the geographical information. For example, in the case in FIG. 8, a text is generated, using "○○ Cafe" as a landmark, which goes like: "○○ Cafe is located to your left." In the case in FIG. 9, a text is generated, using "○○ Shoes" as a landmark, which goes like: "○○ Shoes is located to your right." When the text has been generated, the flow proceeds to step S4-18.

In step S4-18, it is determined whether M is equal to N−1 or not, that is, whether the generations of guidance texts of all segments have been ended or not. When there are segments where the generations of guidance texts have not been ended, the flow proceeds to step S4-19 and when the generations of guidance texts of all segments have been ended, the processing ends.

In step S4-19, a value of variable M is incremented by 1 and the flow returns to step S4-3.

Update of Guidance Text

Figure 12:
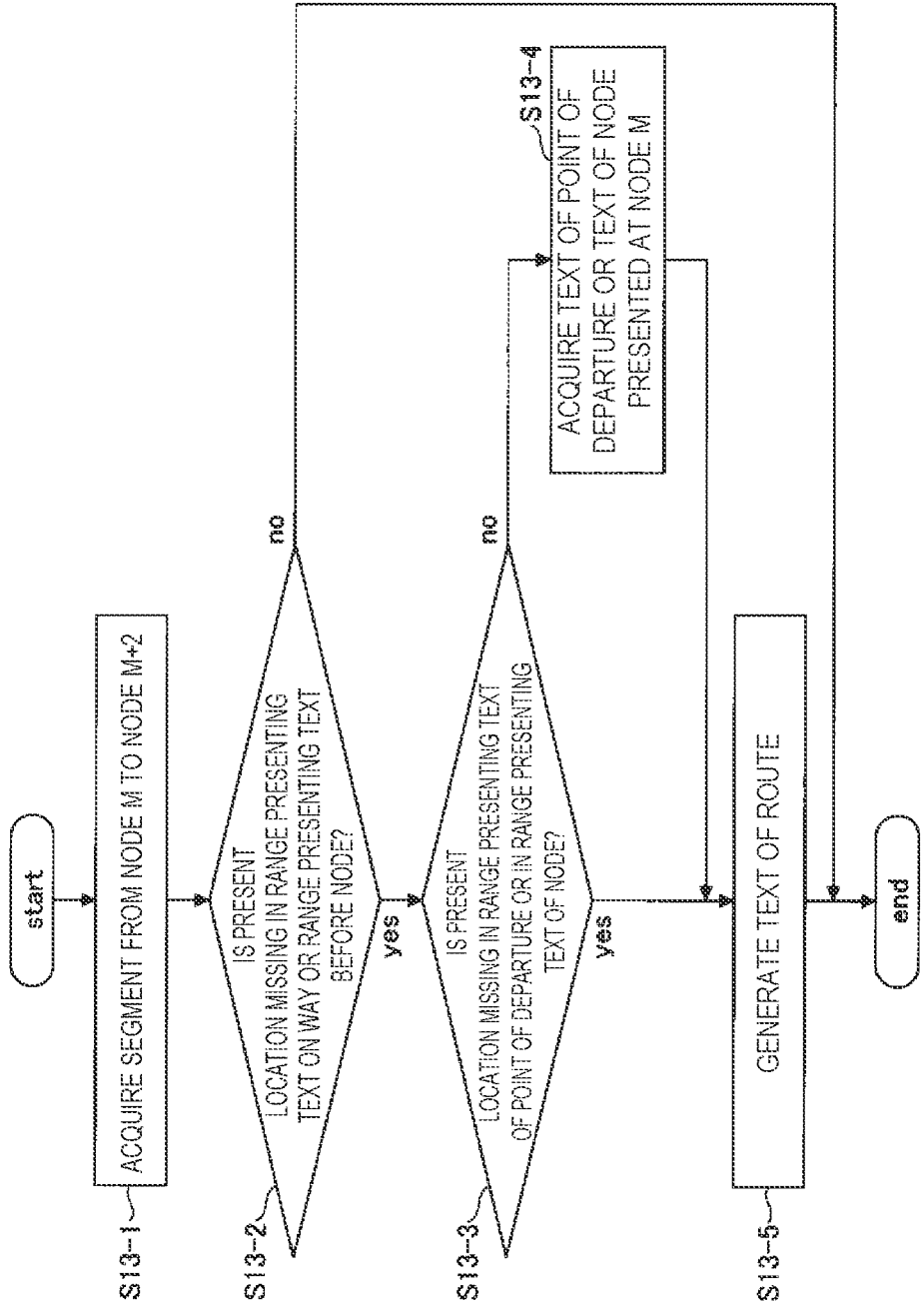
FIG. 12 is a flowchart illustrating an example of a processing procedure for updating a guidance text.

Next, in step S13 in FIG. 6, generation of a guidance text by the guidance text generation unit 105 will be described. FIG. 12 is a flowchart illustrating an example of a processing procedure for updating a guidance text.

First, in step S13-1, the guidance text generation unit 105 acquires two segments from node M immediately before the user's present location to node M+2 from the route. However, when M+2>N, the guidance text generation unit 105 acquires one segment from node M to node M+1. For example, when the user's present location is located between node 1 and node 2, as shown in FIG. 13, a segment from node 1 to node 3 is acquired from the route in FIG. 6.

Figure 14:
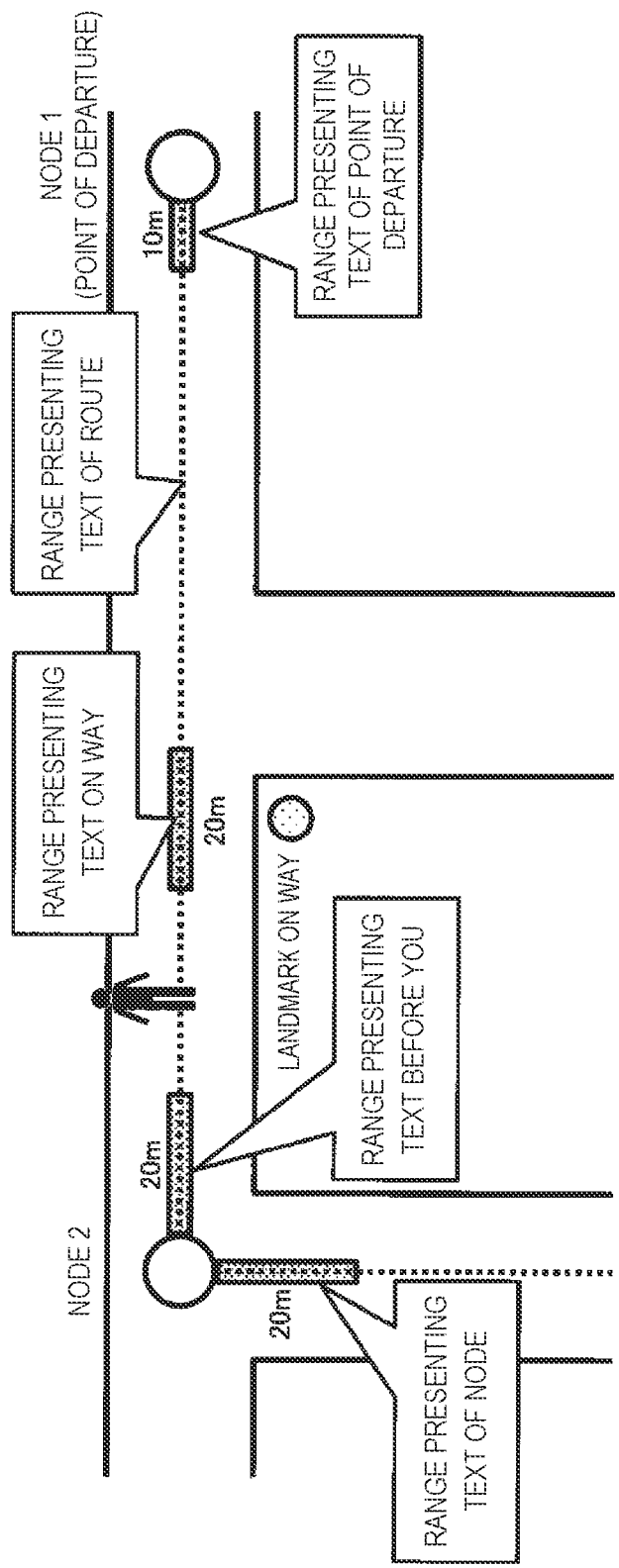
FIG. 14 is a diagram illustrating a range in which various guidance texts are presented.

In step S13-2, the guidance text generation unit 105 determines whether the user's present location falls within a range to present a text on the way or a range to present a text before a node or not. The respective ranges are shown in FIG. 14. The range to present the text on the way is a range 10 m before and after the point at which the geographical information as a landmark on the way exists (range of 20 m in total), and the range to present the text before node is within a range 20 m before the node to the node. When the user's present location falls within any one range, the currently presented text is continuously presented, and so the text is ended without update, and when the user's present location does not fall within any range, the flow proceeds to step S13-3. For example, in a case in FIG. 13, the user's present location is a point 70 m from node 1, and the user's present location falls within neither range, and so the flow proceeds to step S13-3.

In step S13-3, the guidance text generation unit 105 determines whether the user's present location falls within a range to present a text of the point of departure or within a range to present a text of a node. The respective ranges are shown in FIG. 14. The range to present the text of the point of departure is within a range from node 1, which is the point of departure to 10 m after node 1 and the range to present the text of the node is within a range from the node to 20 m after the node. When the user's present location falls within any one range, the flow proceeds to step S13-4 and the flow proceeds to step S13-5 when the user's present location does not fall within the range. For example, in the case in FIG. 13, the present location is a point 70 m from node 1 and does not fall within any range, and so the flow proceeds to step 313-5.

In step 313-4, the guidance text generation unit 105 partially updates and presents the text currently being presented, and so the text of the point of departure or the text of the node currently being presented at node M immediately before the user's present location is acquired and the flow proceeds to step S13-5.

In step 313-5, the guidance text generation unit 105 generates a text to guide the route to the next node (hereinafter referred to as a "text of the route") according to the user's present location. The text of the route is a text included in both the text of the point of departure and the text of the node, and in the case in FIG. 8, the text of the route corresponds to the part "go straight to the second corner to your left and turn left in the corner where the post office is located to your right". In the case in FIG. 9, the text of the route corresponds to the part "Next, go straight to the end and turn right." In step S13-4, when the text of the point of departure or the text of the node has already been acquired, the part of the text of the route is updated in accordance with the user's present location. When the part of the text of the route is updated, since the geographical information that exists within the range from node M to the user's present location is the geographical information the user has already passed through and so not used. If the user has not passed through step S13-4, only the text of the route is generated from among the text of the point of departure and the text of the node that has already been generated by the guidance text generation unit 105. For example, in the case in FIG. 13, since the user's present location is a point 70 m from node 1, a text according to the user's present location is generated, which goes like: "Go straight to the first corner to your left and turn left in the corner where a post office is located to your right." In the case in FIG. 8, since the present location corresponds to a point at which the user has already passed through one corner, the corner the user has passed through is not used to generate the text of the route, and the part "Go straight to the second corner to your left" at the point of departure is updated such as "Go straight to the first corner to your left." Note that the guidance text shown in FIG. 12 is updated when either one or both of the present location and the azimuth is(are) changed in step S12 in FIG. 6. However, the guidance text may be updated every time the user passes through a corner, and when the route is expressed by a distance such as "Go straight 100 m," the guidance text may be updated every time the user moves 1 m.

<Hardware Configuration of Guidance Device>

Figure 15:
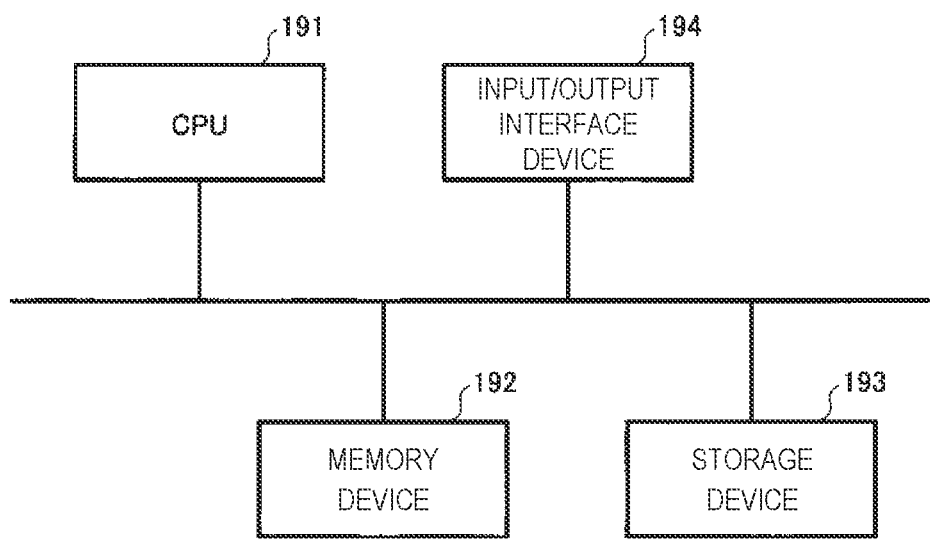
FIG. 15 is a diagram illustrating a hardware configuration example of the guidance device.

FIG. 15 illustrates a hardware configuration example of the guidance device 100. The guidance device 100 may be a computer constructed of a processor such as a CPU (central processing unit) 191, a memory device 192 such as a RAM (random access memory) and a ROM (read only memory) and a storage device 193 such as a hard disk. For example, the function and processing of the guidance device 100 are implemented by the CPU 191 executing data and a program saved in the storage device 193 or the memory device 192. Data may also be input to the guidance device 100 by an input/output interface device 194 and data may be output from the guidance device 100 by the input/output interface device 194. Note that the input/output interface device 194 may be separated from the guidance device 100 and may not be included in the guidance device 100. The guidance device 100 may also be a smartphone, a tablet type computer provided with a touch screen (a touch sensor and a liquid crystal display are implemented by a single piece of hardware), a notebook personal computer (PC) or a desktop PC or the like.

Note that of the guidance device 100, functional parts relating to generation of guidance texts, for example, the route generation unit 103, the guidance text generation unit 105 or the like can be implemented as one guidance text generation device. Furthermore, the screen input unit 101, the guidance control unit 107 and the output unit 109 may be implemented as a guidance text output device on a client side and the route generation unit 103, the guidance text generation unit 105 or the like may be implemented as a guidance text generation device on a server side. The processing segment other than the screen input unit 101, the guidance control unit 107 and the output unit 109 may also be implemented by distributing and arranging the respective functions and data into a plurality of devices and causing the devices to mutually deliver information via the Internet or the like.

Supplement

According to the embodiment of the present invention, it is possible to guide foreign visitors to Japan in navigation using landmarks easy to find and in which they are more confident in a situation in which they are unable to read characters and unfamiliar with the land, and thereby help them walk with confidence. Since guidance texts are generated with contents and quantities considering that the foreign visitors to Japan listen to the guidance at intervals from corner to corner, thus making it possible to guide only by voice without using any screen and reduce the risk of operating the terminal while walking. Since the guidance text is updated in accordance with position information of foreign visitors to Japan, it is possible to provide voice guidance in accordance with the present locations of foreign visitors to Japan.

For convenience of description, the guidance device 100 according to the present embodiment has been described using a functional block diagram, but the guidance device 100 according to the present embodiment may also be implemented by hardware, software or a combination thereof. For example, the present embodiment may also be implemented by a program for causing a computer to execute functions of the guidance device 100, a program for causing a computer to execute each procedure of the method in the guidance device 100. The respective functional parts may be used in combination as required. The method according to the present embodiment may be implemented in order different from the order described above. For convenience of description, although what type of meaning the guidance text is described in Japanese, the guidance text may be translated and presented in each language. For example, the text in Japanese "Go straight to the second corner to your left and turn left in the corner where the post office is to your right" may be translated into English and presented as "Go straight until the second intersection on the left, and please turn left at the intersection where the post office is on the right."

Although the technique for guiding foreign visitors to Japan in navigation using things on a route easy to find and in which they are more confident in a situation in which they are unable to read characters and unfamiliar with the land has been described so far, the present invention is not limited to the above-described embodiment, but various changes or applications can be made without departing from the scope of claims.

REFERENCE SIGNS LIST 100 guidance device
101 screen input unit
103 route generation unit
105 guidance text generation unit
107 guidance control unit
107-1 present location acquisition unit 107-2 azimuth acquisition unit
107-3 notification determination unit
109 output unit
109-1 notification output unit
109-2 guidance text output unit
109-3 voice synthesis unit
109-4 voice output unit
151 route information storage unit
153 geographical information storage unit
155 route storage unit
157 guidance text storage unit

The invention claimed is:

1. A device for generating a guidance text, the device comprising a processor configured to execute operations comprising:
generating, based at least on route data retrieved from a route data store in response to receiving a request to guide a user from a first location to a second location as input, a route, wherein the route comprises a plurality of nodes from a departure point to a destination point,
the plurality of nodes includes the point of departure, corners or/and ends at which a traveling direction changes and the destination, and
the route connects at least a part of the plurality of nodes;
retrieving, based on the route, geographical information from a geographical information store, wherein the geographical information comprises a plurality of types for classifying things located on the route, the plurality of types include at least one of a global brand, a universal sign, an object that is peculiar to a region, or a shop with a name in alphanumeric notation, and a presentation priority of each type of the plurality of types is predetermined based on a first degree of familiarity with a local language and culture along the route;
interactively receiving a second degree of familiarity with language and a regional culture along the route by the user according to an interactive selection of displayed degrees of familiarity a local language and culture along the route;
generating, based on the geographical information according to the first degree of familiarity and the received second degree of familiarity with a local language and culture along the route by the user, a guidance text of the route for guiding the user, wherein the guidance text is based at least on: the generated route, the geographical information of the generated route, and the presentation priority of the type of the plurality of types, and the guidance text comprises a description of a location without a name displayed on a signboard at the location based on the local language and culture by replacing the name with at least one of color, shape, or size of the signboard at the location according to the received second degree of familiarity with language and culture along the route by the user; and
displaying the guidance text including the description of the location using the at least one of color, shape, or size of the signboard according to the second degree of familiarity with the local language and culture along the route by the user, thereby excluding output of the guidance text with one or more descriptions that are unfamiliar to the user.

2. The device according to claim 1, wherein the presentation priority of geographical information is predetermined based on an ease of linguistically and visually recognizing things used for guidance, and the presentation priority is adjustable according to a level of understanding of Japanese language and Japanese culture by the user.

3. The device according to claim 2, wherein the generating the guidance text further comprises generating a first text to be presented at a node and a second text to be presented before arriving at the node using the geographical information, the geographical information is selected from, based on the presentation priority of the geographical information, pieces of the geographical information located within a predetermined range from the node on the generated route.

4. The device according to claim 3, wherein
the processor further configured to execute operations comprising:
when the geographical information includes a type of the plurality of types within a predetermined range after the user passes a predetermined distance in a traveling direction from a node to a predetermined distance before arriving at a next node,
generating a text presenting geographical information as a landmark on the way of the node using the geographical information selected according to the presentation priority of the geographical information; and
when a distance from a node to a next node is a predetermined distance or more,
when the geographical information is without a type of the plurality of types within the predetermined range after the user passes the predetermined distance in the traveling direction from the node to the predetermined distance before arriving at the next node, and
further when there exists geographical information including the type classified as at least the shop with a name in alphanumerical notation,
generating another text presenting geographical information as a landmark on the way of the node using the geographical information selected according to the presentation priority of the geographical information.

5. The device according to claim 3, wherein
the first text to be presented at the node comprises a guidance to the next node, and
the processor further configured to execute operations comprising:
when a user is within a predetermined range after passing the predetermined distance in a traveling direction from a node to the predetermined distance before arriving at the next node, and when the user's present location is not located within a range of a predetermined distance before and after geographical information as a landmark on the way, acquiring a text to guide the user to the next node from a plurality of texts to be presented at the node; and
updating the text to guide the route to the next node by excluding the geographical information associated with an object that the user already passed.

6. The device according to claim 2,
the processor further configured to execute operations comprising:
when the geographical information includes a type of the plurality of types within a predetermined range after the user passes a predetermined distance in a traveling direction from a certain node to a predetermined distance before arriving at a next node,
generating a text presenting geographical information as a landmark on the way of the node using the geographical information selected according to the presentation priority of the geographical information; and when a distance from a certain node to a next node is a predetermined distance or more, when the geographical information is without a type of the plurality of types within predetermined range after the user passes the predetermined distance in the traveling direction from the node to the predetermined distance before arriving at the next node, and further when the geographical information includes the type classified as at least the shop with a name in alphanumerical notation, generating another text presenting geographical information as a landmark on the way of the node using the geographical information selected according to the presentation priority of the geographical information.

7. The device according to claim 1, wherein the generating the guidance text further comprises generating a first text to be presented at a node and a second text to be presented before arriving at the node using the geographical information, and the geographical information is selected from pieces of the geographical information located within a predetermined range from the node on the generated route according to the presentation priority of the geographical information.

8. The device according to claim 7, wherein the first text to be presented at the node comprises a guidance to move to the next node, and the processor further configured to execute operations comprising:

when the user is within a range after passing the predetermined distance in a traveling direction from a node to the predetermined distance before arriving at the next node, and when the user's present location is not located within a range of a predetermined distance before and after geographical information as a landmark on the way, acquiring a text to guide the user to the next node from a plurality of texts to be presented at the node; and updating the text to guide the route to the next node by excluding the geographical information associated with an object that the user already passed.

9. The device according to claim 7, the processor further configured to execute operations comprising:

when the geographical information includes a type of the plurality of types within a predetermined range after the user passes a predetermined distance in a traveling direction from a node to a predetermined distance before arriving at a next node, generating a text presenting geographical information as a landmark on the way of the node using the geographical information selected according to the presentation priority of the geographical information, and when a distance from a node to a next node is a predetermined distance or more, and when the geographical information is without a type of the plurality of types within the predetermined range after the user passes the predetermined distance in the traveling direction from the node to the predetermined distance before arriving at the next node, and further when the geographical information includes the type classified as at least the shop with a name in alphanumerical notation, generating another text presenting geographical information as a landmark on the way of the node using the geographical information selected according to the presentation priority of the geographical information.

10. The device according to claim 1, the processor further configured to execute operations comprising:

when the geographical information includes a type of the plurality of types within a predetermined range after the user passes a predetermined distance in a traveling direction from a node to a predetermined distance before arriving at a next node, generating a text presenting geographical information as a landmark on the way of the node using the geographical information selected according to the presentation priority of the geographical information; and when a distance from a node to a next node is a predetermined distance or more, when the geographical information is without a type of the plurality of types within a range after passing the predetermined distance in the traveling direction from the node to the predetermined distance before arriving at the next node, and further when the geographical information includes the type classified as at least the shop with a name in alphanumerical notation, generating another text presenting geographical information as a landmark on the way of the node using the geographical information selected according to the presentation priority of the geographical information.

11. A computer-readable non-transitory recording medium storing computer-executable program instructions that when executed by a processor cause a computer system to execute operations according claim 1.

12. A system for generating a guidance text, comprising:

a processor configured to execute operations comprising:

generating, based at least on route data retrieved from a route data store in response to receiving a request to guide a user from a first location to a second location as input, a route, wherein the route comprises a plurality of nodes from a departure point to a destination point, the plurality of nodes includes at least a part of the departure point, a corner, an end at which a traveling direction changes, and the destination point, and the route connects at least a part of the plurality of nodes;

retrieving, based on the route, geographical information from a geographical information store, wherein the geographical information includes a plurality of types for classifying a thing located on a route, the plurality of types includes at least one of a global brand, a universal sign, an object that is peculiar to a region, or a shop with a name in alphanumeric notation, and a presentation priority of each type of the plurality of types is predetermined based on a first degree of familiarity with a local language and culture along the route;

interactively receiving a second degree of familiarity with a local language and culture along the route of the user according to an interactive selection of displayed degrees of familiarity with a local language and culture along the route;

generating, based on the geographical information and the first degree of familiarity and the received second degree of familiarity with a local language and culture along the route by the user, a guidance text of route for guiding the user, wherein the guidance text is based at least on:

the generated route, the geographical information of the generated route, the presentation priority of the type of the plurality of types, and the guidance text comprises a description of a location without a name displayed on a signboard at the location based on the local language and culture by replacing the name with at least one of color, shape, or size of the signboard at the location according to the received second degree of familiarity with language and culture along the route by the user; and acquiring a present location of the user;

determining timing of notifying the guidance text to the user based on the generated route and the acquired present location; and generating, based on the guidance text, a synthetic voice signal to output through a speaker device at the timing of notifying the guidance text for guiding the user moving along the generated route, wherein the guidance text comprises the description of the location using the at least one of color, shape, or size of the signboard, thereby excluding output of the guidance text with one or more descriptions that are unfamiliar to the user.

13. A computer implemented method for generating a guidance text, the method comprising:

generating, based at least on route data retrieved from a route data store in response to receiving a request to guide a user from a first location to a second location as input, a route, wherein the route comprises a plurality of nodes from a departure point to a destination point;

the plurality of nodes includes at least a part of the departure point, a corner, and end at which a traveling direction changes, and the destination point, and the route connects at least a part of the plurality of nodes;

retrieving, based on the route, geographical information from a geographical information store, wherein the geographical information comprises a plurality of types for classifying things located on the route, the plurality of types includes at least one of a global brand, a universal sign, an object that is peculiar to a region, and a shop with a name in alphanumeric notation, and a presentation priority of each type of the plurality of types is predetermined based on a first degree of familiarity with a local language and culture along the route;

interactively receiving a second degree of familiarity with a local language and culture by the user according to an interactive selection of displayed degrees of familiarity with the local language and culture;

generating, based on the geographical information according to the first degree of familiarity and the received second degree of familiarity with a local language and culture by the user, a guidance text of the route for guiding the user, wherein the guidance text is based at least on: the generated route, the geographical information of the generated route, the presentation priority of the type of the plurality of types, and the guidance text comprises a description of a location without a name displayed on a signboard at the location based on the local language and culture by replacing the name with at least one of color, shape, or size of the signboard at the location according to the received second degree of familiarity with language and culture along the route by the user: and displaying the guidance text according to the second degree of familiarity with a local language and culture along the route by the user for guiding the user moving along the route, wherein the guidance text comprises the description of the location using the at least one of color, shape, or size of the signboard, thereby excluding output of the guidance text with one or more descriptions that are unfamiliar to the user.

* * * * *